(12) United States Patent
Gleitman

(10) Patent No.: US 8,407,006 B2
(45) Date of Patent: *Mar. 26, 2013

(54) MULTIPLE DISTRIBUTED FORCE MEASUREMENTS

(75) Inventor: Daniel D. Gleitman, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,270

(22) Filed: Jun. 13, 2011

(65) Prior Publication Data

US 2011/0253447 A1    Oct. 20, 2011

Related U.S. Application Data

(63) Continuation of application No. 12/493,845, filed on Jun. 29, 2009, now Pat. No. 7,962,288.

(51) Int. Cl.
*G01V 1/00* (2006.01)
(52) U.S. Cl. .......................................... 702/9

(58) Field of Classification Search ........ 702/7, 182–185, 702/9
See application file for complete search history.

(56) References Cited

U.S. PATENT DOCUMENTS

| | | | | |
|---|---|---|---|---|
| 3,827,294 A * | 8/1974 | Anderson | ................ | 73/152.48 |
| 3,855,853 A * | 12/1974 | Claycomb | ................ | 73/152.48 |
| 3,855,867 A * | 12/1974 | Roach | ................ | 73/864.18 |
| 6,315,062 B1 * | 11/2001 | Alft et al. | ................ | 175/45 |
| 7,383,876 B2 * | 6/2008 | Gray et al. | ................ | 166/55.7 |

\* cited by examiner

*Primary Examiner* — Edward Raymond
(74) *Attorney, Agent, or Firm* — Alan Bryson; Baker Botts L.L.P.

(57) ABSTRACT

Methods, computer programs, and systems for detecting at least one downhole condition are disclosed. Forces are measured at a plurality of locations along the drillstring. The drillstring includes a drillpipe. At least one of the forces is measured along the drillpipe. At least one downhole condition is detected based, at least in part, on at least one measured force.

39 Claims, 22 Drawing Sheets

MULTIPLE DISTRIBUTED FORCE MEASUREMENTS

CROSS-REFERENCE TO RELATED APPLICATIONS

This application is a continuation of U.S. patent application Ser. No. 12/493,845, filed Jun. 29, 2009 now U.S. Pat. No. 7,962,288 entitled "Multiple Distributed Force Measurements," by Daniel Gleitman, which, in turn claims priority to commonly owned U.S. Pat. No. 7,555,391, filed Mar. 2, 2005, entitled "Multiple Distributed Force Measurements," by Daniel Gleitman, which, in turn claims priority to commonly owned U.S. provisional patent application Ser. No. 60/550,033, filed Mar. 4, 2004, entitled "Multiple Distributed Sensors Along A Drillpipe," by Daniel Gleitman.

BACKGROUND

As oil well drilling becomes increasingly complex, the importance of collecting downhole data while drilling increases.

DETAILED DESCRIPTION

Figure 1:
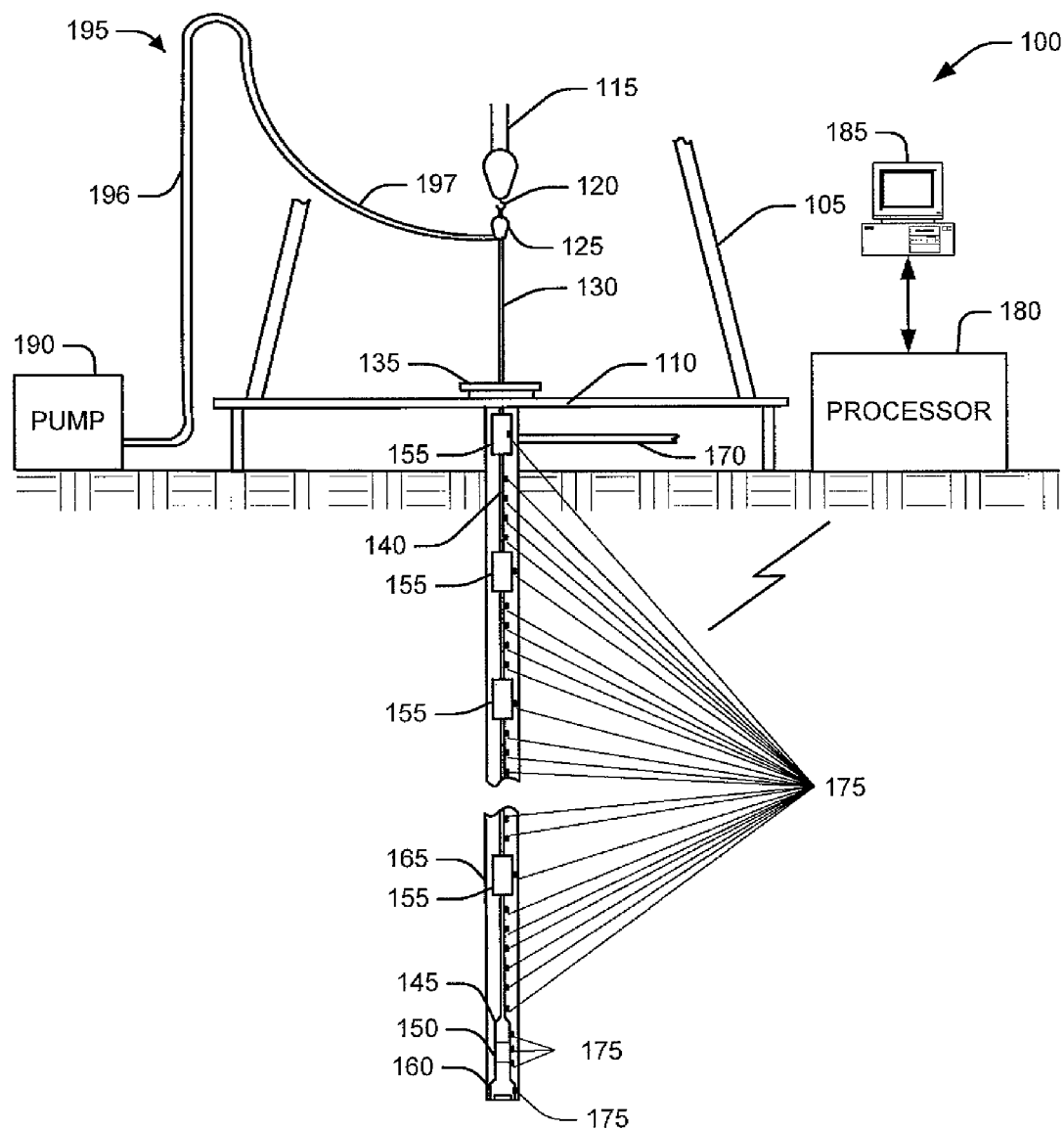
FIG. 1 shows a system for processing downhole data.

As shown in FIG. 1, oil well drilling equipment 100 (simplified for ease of understanding) may include a derrick 105, derrick floor 110, draw works 115 (schematically represented by the drilling line and the traveling block), hook 120, swivel 125, kelly joint 130, rotary table 135, drillpipe 140, one or more drill collars 145, one or more MWD/LWD tools 150, one or more subs 155, and drill bit 160. Drilling fluid is injected by a mud pump 190 into the swivel 125 by a drilling fluid supply line 195, which may include a standpipe 196 and kelly hose 197. The drilling fluid travels through the kelly joint 130, drillpipe 140, drill collars 145, and subs 155, and exits through jets or nozzles in the drill bit 160. The drilling fluid then flows up the annulus between the drillpipe 140 and the wall of the borehole 165. One or more portions of borehole 165 may comprise open hole and one or more portions of borehole 165 may be cased. The drillpipe 140 may be comprised of multiple drillpipe joints. The drillpipe 140 may be of a single nominal diameter and weight (i.e. pounds per foot) or may comprise intervals of joints of two or more different nominal diameters and weights. For example, an interval of heavy-weight drillpipe joints may be used above an interval of lesser weight drillpipe joints for horizontal drilling or other applications. The drillpipe 140 may optionally include one or more subs 155 distributed among the drillpipe joints. If one or more subs 155 are included, one or more of the subs 155 may include sensing equipment (e.g., sensors), communications equipment, data-processing equipment, or other equipment. The drillpipe joints may be of any suitable dimensions (e.g., 30 foot length). A drilling fluid return line 170 returns drilling fluid from the borehole 165 and circulates it to a drilling fluid pit (not shown) and then the drilling fluid is ultimately recirculated via the mud pump 190 back to the drilling fluid supply line 195. The combination of the drill collar 145, MWD/LWD tools 150, and drill bit 160 is known as a bottomhole assembly (or "BHA"). The combination of the BHA, the drillpipe 140, and any included subs 155, is known as the drillstring. In rotary drilling the rotary table 135 may rotate the drillstring, or alternatively the drillstring may be rotated via a top drive assembly.

The terms "couple" or "couples," as used herein are intended to mean either an indirect or direct connection. Thus, if a first device couples to a second device, that connection may be through a direct connection, or through an indirect electrical connection via other devices and connections. The term "upstream" as used herein means along a flow path towards the source of the flow, and the term "downstream" as used herein means along a flow path away from the source of the flow. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

One or more force sensors 175 may be distributed along the drillpipe, with the distribution depending on the needs of the system. In general, the force sensors 175 may include one or more sensor devices to produce an output signal responsive to a physical force, strain or stress in a material. The sensor devices may comprise strain gauge devices, semiconductor devices, photonic devices, quartz crystal devices, or other devices to convert a physical force, strain, or stress on or in a material into an electrical or photonic signal. In certain embodiments, the force measurements may be directly obtained from the output of the one or more sensor devices in the force sensors 175. In other embodiments, force measurements may be obtained based on the output of the one or more sensor devices in conjunction with other data. For example, the measured force may be determined based on material properties or dimensions, additional sensor data (e.g. one or more temperature or pressure sensors), analysis, or calibration.

One or more force sensors 175 may measure one or more force components, such as axial tension or compression, or torque, along the drillpipe. One or more force sensors 175 may be used to measure one or more force components reacted by or consumed by the borehole, such as borehole-drag or borehole-torque, along the drillpipe. One or more force sensors 175 may be used to measure one or more other force components such as pressure-induced forces, bending forces, or other forces. One or more force sensors 175 may be used to measure combinations of forces or force components. In certain implementations, the drillstring may incorporate one or more sensors to measure parameters other than force, such as temperature, pressure, or acceleration.

In one example implementation, one or more force sensors 175 are located on or within the drillpipe 140. Other force sensors 175 may be on or within one or more drill collars 145 or the one or more MWD/LWD tools 150. Still other force sensors 175 may be in built into, or otherwise coupled to, the bit 160. Still other force sensors 175 may be disposed on or within one or more subs 155. One or more force sensors 175 may provide one or more force or torque components experienced by the drillstring at surface. In one example implementation, one or more force sensors 175 may be incorporated into the draw works 115, hook 120, swivel 125, or otherwise employed at surface to measure the one or more force or torque components experienced by the drillstring at the surface.

The one or more force sensors 175 may be coupled to portions of the drillstring by adhesion or bonding. This adhesion or bonding may be accomplished using bonding agents such as epoxy or fasters. The one or more force sensors 175 may experience a force, strain, or stress field related to the force, strain, or stress field experienced proximately by the drillstring component that is coupled with the force sensor 175.

Other force sensors 175 may be coupled to not experience all, or a portion of, the force, strain, or stress field experienced by the drillstring component coupled proximate to the force sensor 175. Force sensors 175 coupled in this manner may, instead, experience other ambient conditions, such as one or more of temperature or pressure. These force sensors 175 may be used for signal conditioning, compensation, or calibration.

The force sensors 175 may be coupled to one or more of: interior surfaces of drillstring components (e.g. bores), exterior surfaces of drillstring components (e.g. outer diameter), recesses between an inner and outer surface of drillstring components. The force sensors 175 may be coupled to one or more faces or other structures that are orthogonal to the axes of the diameters of drillstring components. The force sensors 175 may be coupled to drillstring components in one or more directions or orientations relative to the directions or orientations of particular force components or combinations of force components to be measured.

In certain implementations, force sensors 175 may be coupled in sets to drillstring components. In other implementations, force sensors 175 may comprise sets of sensor devices. When sets of force sensors 175 or sets of sensor devices are employed, the elements of the sets may be coupled in the same, or different ways. For example, the elements in a set of force sensors 175 or sensor devices may have different directions or orientations, relative to each other. In a set of force sensors 175 or a set of sensor devices, one or more elements of the set may be bonded to experience a strain field of interest and one or more other elements of the set (i.e. "dummies") may be bonded to not experience the same strain field. The dummies may, however, still experience one or more ambient conditions. Elements in a set of force sensors 175 or sensor devices may be symmetrically coupled to a drillstring component. For example three, four, or more elements of a set of sensor devices or a set of force sensors 175 may spaced substantially equally around the circumference of a drillstring component. Sets of force sensor 175 or sensor devices may be used to: measure multiple force (e.g. directional) components, separate multiple force components, remove one or more force components from a measurement, or compensate for factors such as pressure or temperature. Certain example force sensors 175 may include sensor devices that are primarily unidirectional. Force sensors 175 may employ commercially available sensor device sets, such as bridges or rosettes.

In certain implementations, one or more force sensors 175 may be coupled to drillstring components that are used for drilling and that are subsequently left in the borehole 165. These drillstring components may be used in casing-while-drilling (i.e. drilling with casing) operations. The drillstring components may be included in a completed well.

In general, the force sensors 175 convert force into one or more signals. The one or more signals from the force sensors 175 may be analog or digital. In certain implementations, one or more force sensors 175 may be oriented to measure one or more of tension or compression along the drillstring (i.e. with respect to the up-hole/downhole axis). As used herein, "tensile force" means one or more of tension or compression forces along the drillstring. In these implementations, the force sensors 175 may be coupled with particular drillstring components and may include strain responsive sensor devices (e.g. strain gauges). The output of the force sensor 175 may vary based on the modulus of elasticity of the material of drillstring component coupled with the force sensor. This modulus of elasticity may be used when determining the force. In certain implementations, other inputs (e.g. tensile areas) may be used to determine tension or compression forces in one or more drillstring components from the stresses. Similarly, one or more force sensors 175 may be oriented to measure torque on the drillstring (i.e. about the up-hole/downhole axis). For example, the force sensors 175 may be coupled to diameter surfaces (e.g. inner or outer diameters) of drillstring components and may employ outputs from sensor devices (e.g., one or more strain gauges) and may consider the shear modulus of elasticity of the drillstring component material. The torques may be determined based on the stresses from the strains and other inputs (e.g. polar moment of inertia of the cross sectional area).

Figure 2:
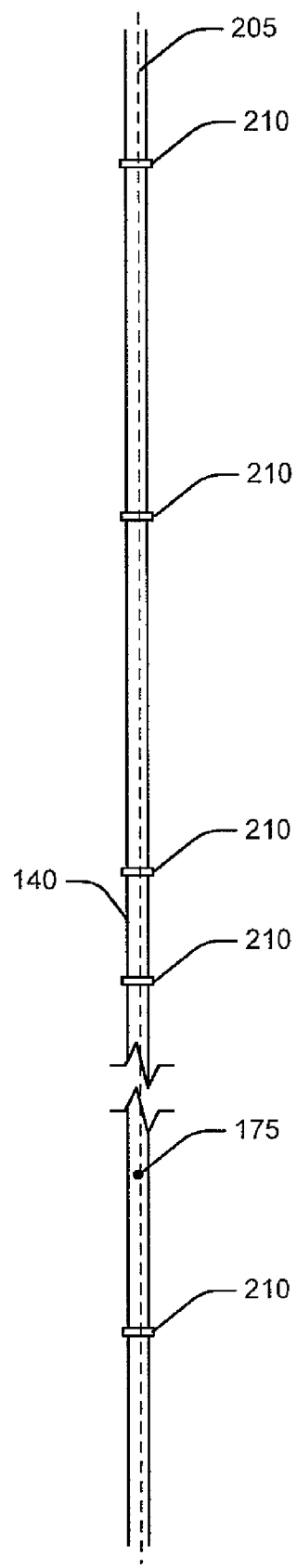
FIG. 2 illustrates a portion of drillpipe with an affixed sensor and a communications medium.

A portion of drillpipe 140 is schematically illustrated in FIG. 2. The illustrated portion of drillpipe includes interfaces 210 between the joints that form drillpipe 140. Interfaces 210 may include threaded mechanical connections which may have different inner and outer diameters as compared to the balance of the drillpipe. One or more of the interfaces 210 may include communication interfaces. Signals from force sensors 175 are coupled to communications medium 205, which may be disposed in the drillpipe 140 or external to the drillpipe 140. Drillpipe, such as drillpipe 140, with communications medium 205, may collectively be referred to as a wired drillpipe.

In one example system, the communications medium 205 may be located within an inner annulus of the drillpipe 140. The communications medium 205 may comprise one or more concentric layers of a conductor and an insulator disposed within the drillstring. In another example system, the drillpipe 140 may have a gun-drilled channel though at least portions of its length. In such a drillpipe 140, the communications medium 205 may be placed in the gun-drilled channel. In another example system, the communications medium 205 may be fully or partly located within a protective housing, such as a capillary tubing that runs at least a portion of the length of the drillpipe 140. The protective housing may be attached or biased to the drillpipe inner diameter or stabilized within the drillpipe bore.

The communications medium 205 may be a wire, a cable, a fluid, a fiber, or any other medium. In certain implementations, the communications medium may permit high data transfer rates. The communications medium 205 may include one or more communications paths. For example, one communications path may connect to one or more force sensors 175, while another communications path may connect another one or more sensor sensors 175. The communications medium 205 may extend from the drillpipe 140 to the subs 155, drill collar 145, MWD/LWD tools 150, and the bit 160. The communications medium 205 may include physical connectors or mating conductors to complete a transition in the communications medium 205 across drillpipe joints and other connections.

The communications medium 205 may transition from one type to another along the drillstring. For example, one or more portions of the communications medium 205 may include an LWD system communications bus. One more or portions of the communications medium 205 may comprise a "short-hop" electromagnetic link or an acoustical telemetry link. The "short-hop" electromagnetic links or acoustical telemetry link may be used to interface between drillpipe joints or across difficult-to-wire drillstring components such as mud motors. In certain implementations, the communications medium may include long-hop (i.e., from a downhole transmitter to a surface receiver) telemetry. For example, the long-hop telemetry may be mud-pulse telemetry, electromagnetic telemetry through the Earth, or acoustic telemetry through the drillstring. The long-hop telemetry may employ one or more repeaters.

A processor 180 may be used to collect and analyze data from one or more force sensors 175. This processor 180 may process the force data and provide an output that is a function of the processed or unprocessed force data. This output may then be used in the drilling process. The processor may include one or more processing units that operate together (e.g., symmetrically or in parallel) or one or more processing units that operate separately. The processing units may be in the same location or in distributed locations. The processor 180 may alternatively be located below the surface, for example, within the drillstring. The processor 180 may operate at a speed that is sufficient to be useful in the drilling process. The processor 180 may include or interface with a terminal 185. The terminal 185 may allow an operator to interact with the processor 180.

The communications medium 205 may transition to connect the drillstring to the processor 180. The transition may include a mechanical contact which may include a rotary brush electrical connection. The transition may include a non-contact link which may include an inductive couple or a short-hop electromagnetic link.

The force sensors 175 may communicate with the processor 180 through the communications medium 205. Communications over the communications medium 205 can be in the form of network communications, using, for example, Ethernet. Each of the force sensors 175 may be addressable individually or in one or more groups. Alternatively, communications can be point-to-point. Whatever form it takes, the communications medium 205 may provide high-speed data communication between the sensors in the borehole 165 and the processor 180. The speed and bandwidth characteristics of the communications medium 205 may allow the processor 180 to perform collection and analysis of data from the force sensors 175 fast enough for use in the drilling process. This data collection and analysis may be referred to as "real-time" processing. Therefore, as used herein, the term "real-time" means a speed that is useful in the drilling process.

Figure 3:
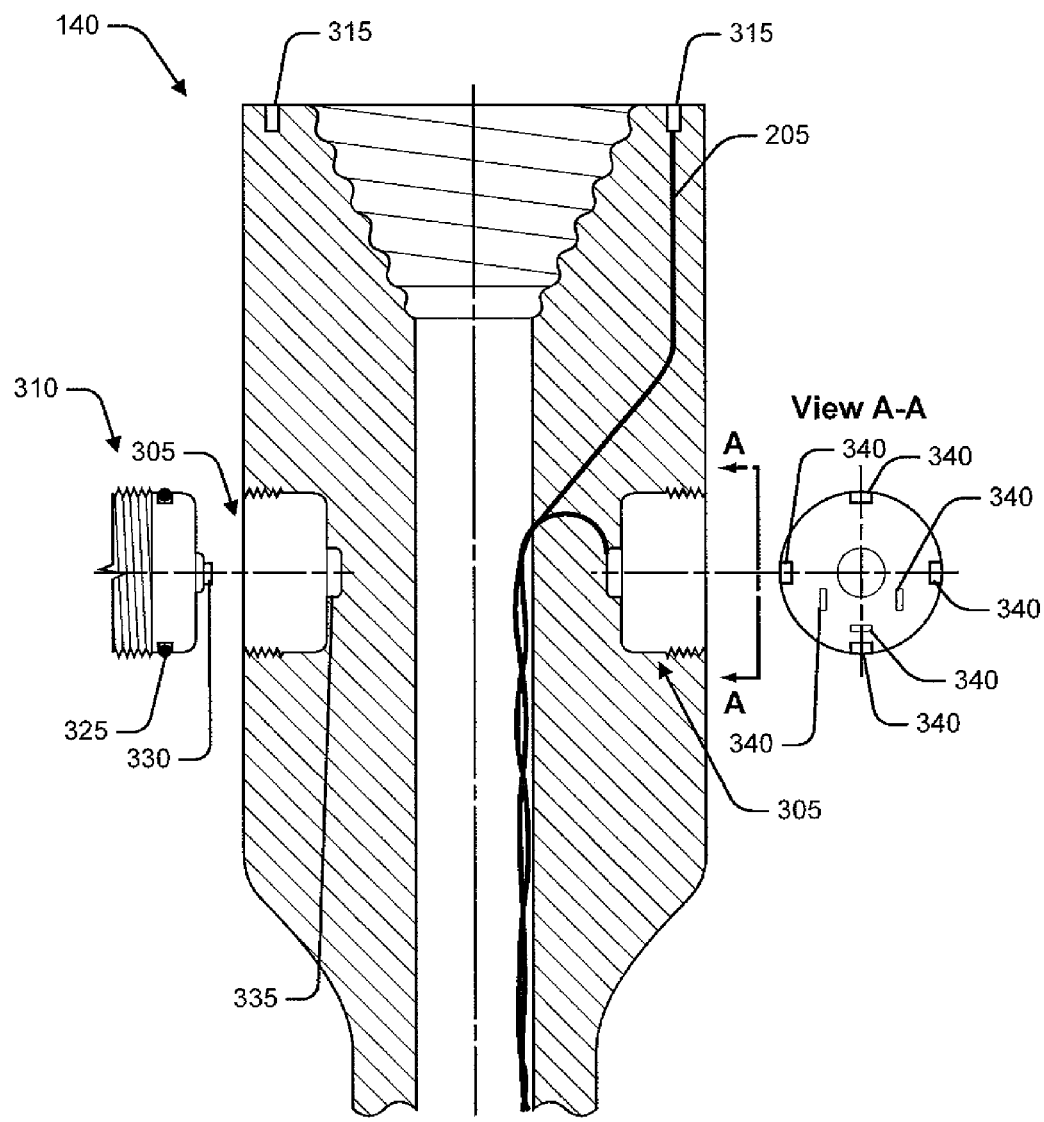
FIG. 3 illustrates a portion of drillpipe with a force sensor in a sensor-module receptacle.

A portion of a drillstring component is illustrated in FIG. 3. By way of example, the illustrated drillstring component is a joint of drillpipe 140. Similar implementation may be applied to one or more of subs 155, collars, MWD/LWD tools 175, or the bit 160. The example drillpipe joint has an elongated box-end upset section. A sensor-module receptacle 305 is defined by a recess in the exterior of the drillpipe joint's elongated upset section, below the rotary shoulder connection threads. The sensor-module receptacle 305 may be any suitable size or shape to engage and retain at least a portion of a force sensor 175. The force sensor 175 may include an electronics module 310. The sensor-module receptacle 305 may also include threading to retain at least a portion of the force sensor 175 (e.g. the electronics module 310) within sensor-module receptacle 305. The drillpipe 140 may also include one or more drillpipe couplers, such as drillpipe coupler 315, to couple signals between portions of the drillstring. Communications medium 205 may be disposed in drillpipe 140, and drillpipe couplers such as drillpipe coupler 315 may couple signals into communications medium 205. When the sensor-module receptacle 305 is empty, a sensor-module-receptacle cover may be used to cover the sensor-module receptacle 305. An example sensor-module-receptacle cover (not shown) may have an exterior for engaging the sensor-module receptacle 305. FIG. 3 shows an example electronics module 310 aligned for insertion into a sensor-module receptacle 305.

FIG. 3 shows an example sensor-module-receptacle with electronics module 310 removed to highlight remaining details within the sensor-module-receptacle. Example locations (non-limiting) within the sensor-module-receptacle are shown on the right side of FIG. 3 for coupling of one or more sensor devices 340 which may be elements of a force sensor 175. The sensor devices may be, for example, strain gauge devices or sets of strain gauges (e.g. bridges or rosettes). Such example locations may be at locations along a wall of sensor-module receptacle 305, which may be a substantially cylindrical wall. Example locations for mounting sensor devices, may be on the bottom (i.e. radially most inward) surface of sensor-module receptacle 305. One or more sensor devices may be configured within a sensor-module receptacle 305 with any of the sensor device quantities, symmetry, types, directions, orientations, coupling approaches, and other characteristics of the sensor devices discussed above. Wiring between the sensor devices 340 and the electronics modules 310 may be routed through holes or grooves from one or more sensor devices to electronics module 310, using connectors or directly soldering.

The electronics module 310 may have complementary features, such as threading, to engage the sensor-module receptacle 305 threading. The electronics module 310 may have a protective exterior and may have o-rings 325 to isolate it from the ambient conditions exterior to the drillpipe 140 which may include the mud flowing around drillpipe 140. At least a portion of the electronics module 310 may be inserted and removed from sensor-module receptacle 305 to permit swapping or replacement, based on the type of data to be collected in the portion of the drillpipe 140 where the force sensor 175 will be located, or for maintenance. The electronics module 310 may include a connector 330 to mate with a connector 335 in the sensor-module receptacle 305.

Figure 4:
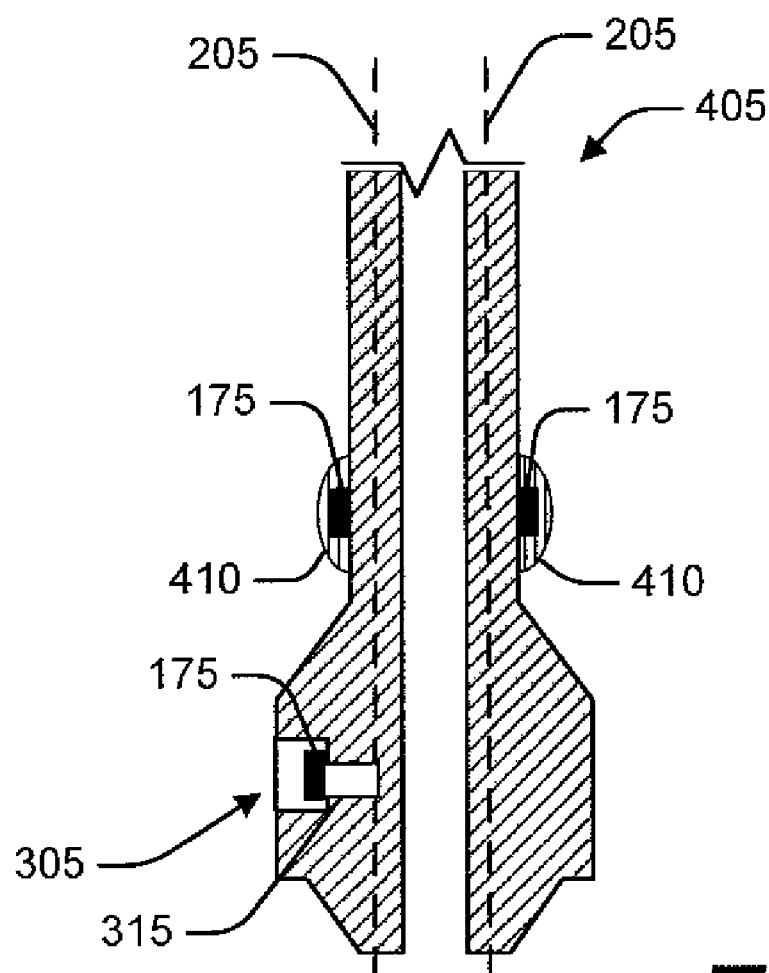
FIG. 4 is a cut-away diagram of the pin-end of a drillpipe joint with force sensors affixed to the joint.

Force sensors 175 may also be located in the pin ends of drillstring elements, for example drillpipe joints. A cross-sectional diagram of the pin end 405 of a drillpipe joint is shown in FIG. 4. The pin end 405 of the joint may include a sensor module receptacle 305. One or more sensor devices may be configured within sensor-module receptacle 305, for example, with any of the sensor device quantities, symmetry, types, directions, orientations, coupling approaches, wiring, and other characteristics of the sensor devices discussed above. One or more force sensors 175 may be affixed to the exterior of the drillpipe joint. One or more force sensor 175 may include one or more sensor devices affixed to the exterior of the drillpipe joint, an electronics module located elsewhere (e.g. in a sensor module receptacle 310), and wiring between the two. One or more force sensors 175 or portions of force sensor 175 (e.g. sensor devices) may be encased in a covering 410. In certain implementations, the covering 410 may include, for example, a hermetic elastomer or epoxy. One or more of the force sensors 175 mounted to the exterior of the drillpipe may be located near the pin end upset. One or more force sensors 175 mounted to the exterior of the drillpipe may be located on a smaller cross-sectional area section as shown in FIG. 4. Such mounting may provide greater strain for a given force or torque as compared to mounting on an upset section and may enhance force or torque measurement quality (e.g. resolution). In general, one or more force sensors 175 may be configured to measure one or more of tension, compression, torque, or bending. The pin end 405 insert may include one or more communications couplers, such as drillpipe coupler 315. The communications medium 205 may be disposed in the drillpipe.

Figure 5:
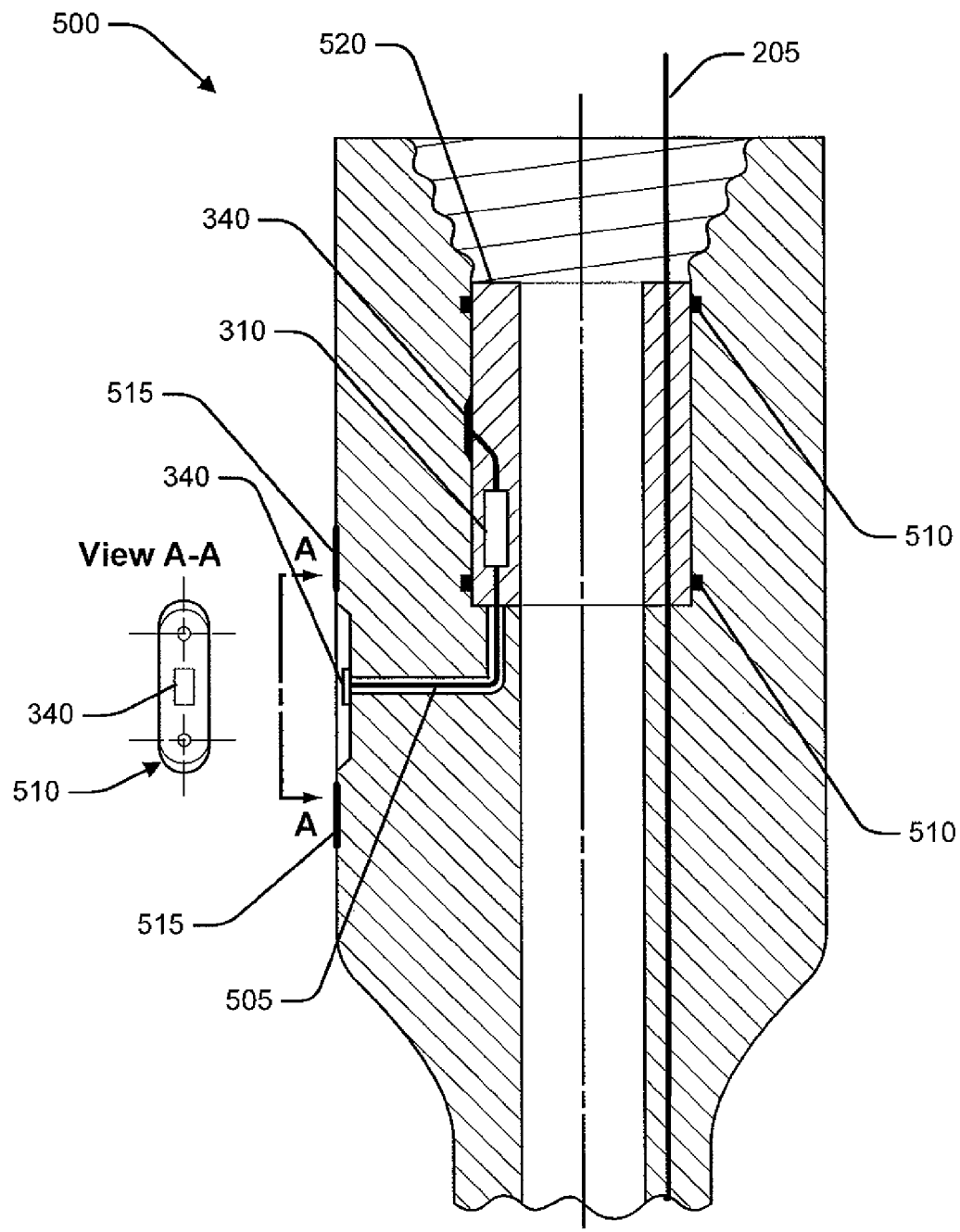
FIG. 5 is a cut-away diagram of a node sub with a force sensor.

A cross-sectional diagram of an example sub 155 is shown in FIG. 5. The sub 155 shown in FIG. 5 may include threading to attach between two drillpipe joints. An elongated box joint 500 of the sub 155 is shown, as an example, with similar implementation possible on other drillstring components. A force sensor 175 is shown comprised of an electronics module 310, one or more sensor devices 340, and wiring 505 between the sensor devices 340 and the electronics module 310. One or more portions of the exterior of sub 155 may be cut or milled away to form relatively shallow "flats," such as flat 510, at one or more locations. One or more flats 510 may be oriented around the circumference of sub 155. One or more sensor devices 340 may be adhered to the flats 510. The adhered sensor devices 340 may be protected from the ambient mud with an overlay. The overlay may be, for example, an epoxy, or an elastomer. Hard facing 515 such as a satellite overlay may also be employed near the flats for protection from the borehole wall.

The force sensor 175 may include "dummy" sensor devices proximately located and coupled in a manner to not respond to strain in the drillstring element. Alternatively, or in addition, one or more sensor devices 340 may be coupled to the inner bore of sub 155. The box-end of the sub 155 may be bored back to retain a box-end insert 520. The box-end insert 520 may include one or more electronics modules 310. Wiring 505 may be routed from one or more of the sensor devices 340 coupled to the exterior of sub 155 through drilled holes and through hermetic sealing connectors, for connecting or soldering to the electronics module 310. Wiring 505 may be routed from one or more sensor devices 340 coupled to the inner bore of sub 155 to the electronics module. The electronics module 310 may include a coupler to couple the force sensor 175 to the communications medium 205.

The sub 155 and box-end insert 520 may include one or more sensor devices 340 configured to measure one or more of axial tension, axial compression, torque, or bending. The box-end insert may include one or more communications couplers. The communications medium 205 may be disposed in the sub 155. As discussed above, the sub 155 may include communication equipment.

Figure 6:
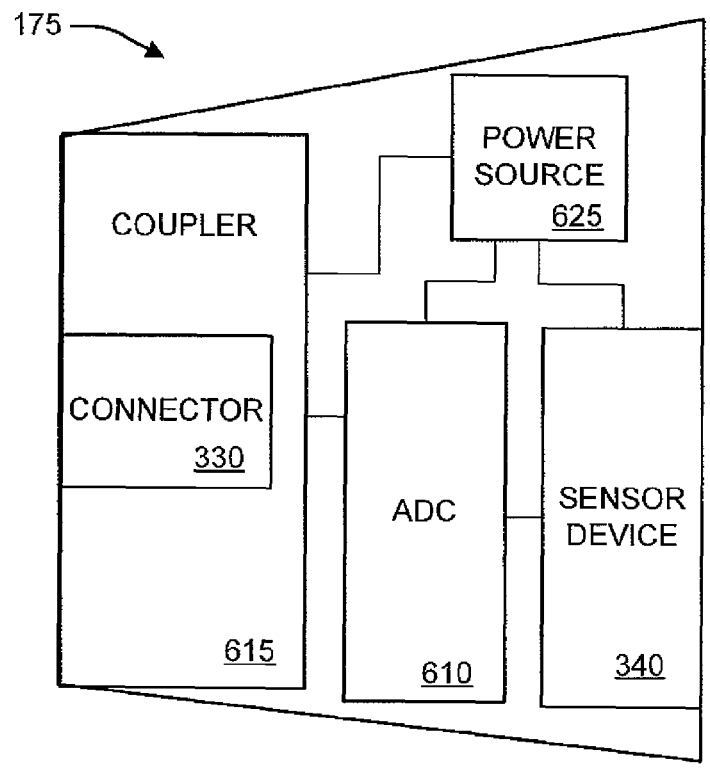
FIG. 6 shows a block diagram for a force sensor.
Figure 7:
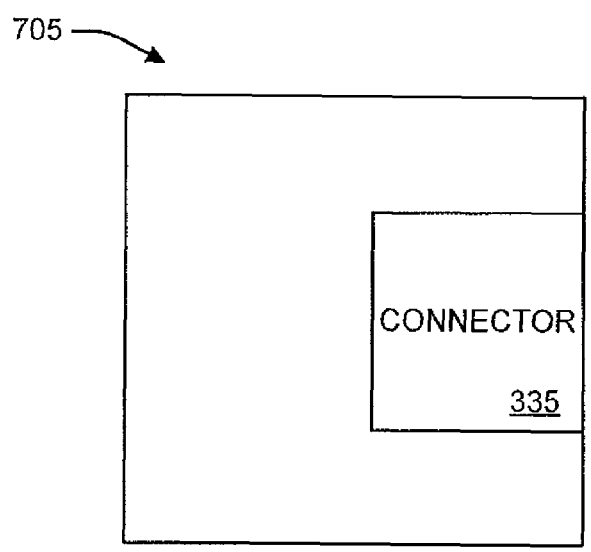
FIG. 7 shows a block diagram of a drillpipe coupler.

An example force sensor 175, shown schematically in FIG. 6, includes a sensor device 340 to produce a signal indicative of the force it experiences. The output from the sensor device 340 may be digital or analog. Depending on the mode of communications used over the communications medium 205, the output from the sensor device 340 may require conversion from analog to digital with an analog-to-digital converter 610. In certain implementations, the force sensor 175 may include a plurality of analog-to-digital converters 610 to accommodate multiple sensor devices 340. In other implementations, the force sensor 175 may include a multiplexer (not shown) to accommodate multiple sensor devices 340 with fewer analog-to-digital converters 610. After the sensor device 340 has produced a signal indicative of the measured force, the signal may be coupled to the communication medium 205 using a communications coupler, which may include a electronics module coupler 615 within the force sensor 175 and may include a drillpipe coupler. The electronics module coupler 615 may include a connector 330 for inducing a signal in the drillpipe coupler 705, shown in FIG. 7. The drillpipe coupler may include a connector 335 for engaging the electronics-module coupler connector 330. Connectors may include direct electrical connection and example suitable connectors of this type include those from Kemlon and Greene Tweed, both of Houston, Tex.

The communication coupler, which is the combination of the electronics module coupler 615 and the drillpipe coupler, performs signal transformations necessary to couple the sensor signal to the communications medium 205. One example communication coupler may re-encode the signal from the sensor device 340 or the analog-to-digital converter, include header information, and transmit the signal over the communication medium 205.

Figure 8:
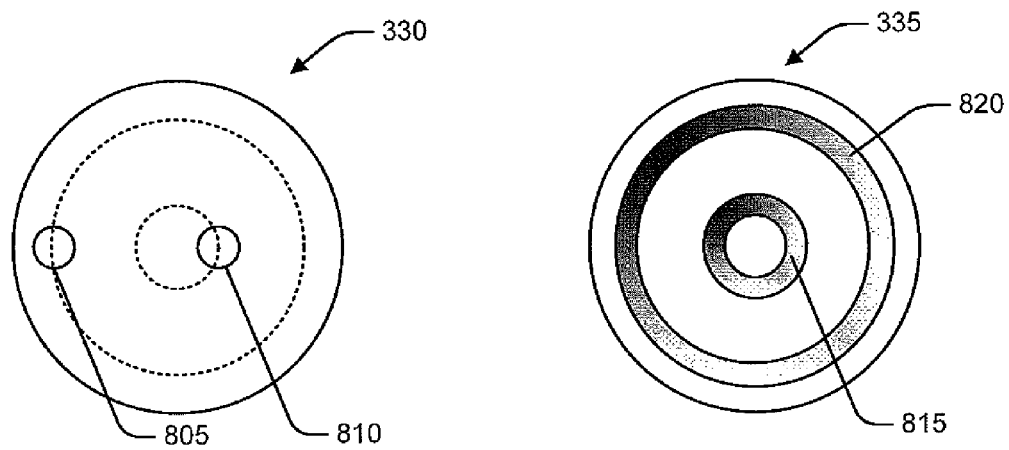
FIGS. 8 and 9 illustrate connectors for sensor couplers and electronics module couplers.

An example complementary pair of electronics module coupler and drillpipe coupler connectors 330 and 335 is shown schematically in section view in FIG. 8. The drillpipe-coupler connector 330 includes two conductive plugs 805 and 810, which will protrude from the drillpipe 140 at the base of the sensor-module receptacle 305. The complementary sensor-coupler connector 335 includes two conductive rings 815 and 820. This arrangement allows the connectors 330 and 335 to mate when, for example, the electronics module sensor 310 is screwed into the sensor-module receptacle 305. In such a configuration, the drillpipe coupler 705 and the electronics module coupler 615 have a direct electrical connection and the drillpipe coupler may be in direct electrical contact with the communications medium 205.

Figure 9:
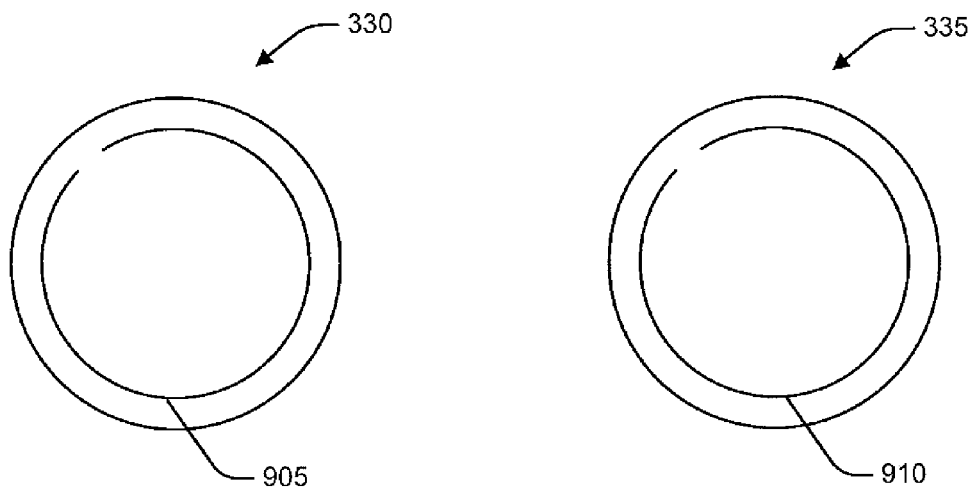

Another example complementary pair of sensor-coupler and drillpipe-coupler connectors 330 and 335 is shown in FIG. 9. The electronics module connector 330 includes an antenna 905 and the drillpipe-coupler connector includes an antenna 910. In such a configuration, the electronics module coupler 615 transmits the signal indicative of the one or more measured properties to the drillpipe coupler using wireless signaling. For example, the sensor and drillpipe coupler may communicate using short-hop telemetry or another wireless communication method. Each of the antennas 905 and 910 may be any antenna or other transducer capable of providing communication between the electronics module coupler 615 and the drillpipe coupler 705.

In another example system, the electronics module coupler connector 330 and the drillpipe-coupler connector 335 may include inductors or coils. The electronics module coupler 615 may pass current through its inductor to create an electromagnetic field indicative of the force sensor signal. The electromagnetic field, in turn, induces a current in the drillpipe coupler's inductor. In another example system, the connectors 330 and 335 may form two plates of a capacitor allowing a signal to be capacitively induced on the opposing plate. The force sensor 175 or the base of the sensor-module receptacle 305 may include a coating or insert to provide a dielectric between the connectors 820 and 905 for capacitive coupling.

Returning to FIG. 6, the components in force sensor 175 may require power to operate. In one example system, the necessary power may be provided by power source 625, which may be a battery, such as a lithium battery. In another example system, the necessary power may be supplied over the communication medium 205 using, for example, Power Over Ethernet (POE). In yet another example system, a separate power line may be run through the drillpipe 205 and taps may be provided for the attached force sensors 175. One or more force sensors 175 may be powered from a central bus with power provided from the surface, or from a downhole central battery module. The power may be generated by, for example, a downhole generator driven by the mud flow or drillpipe rotation, or another power source.

Figure 10:
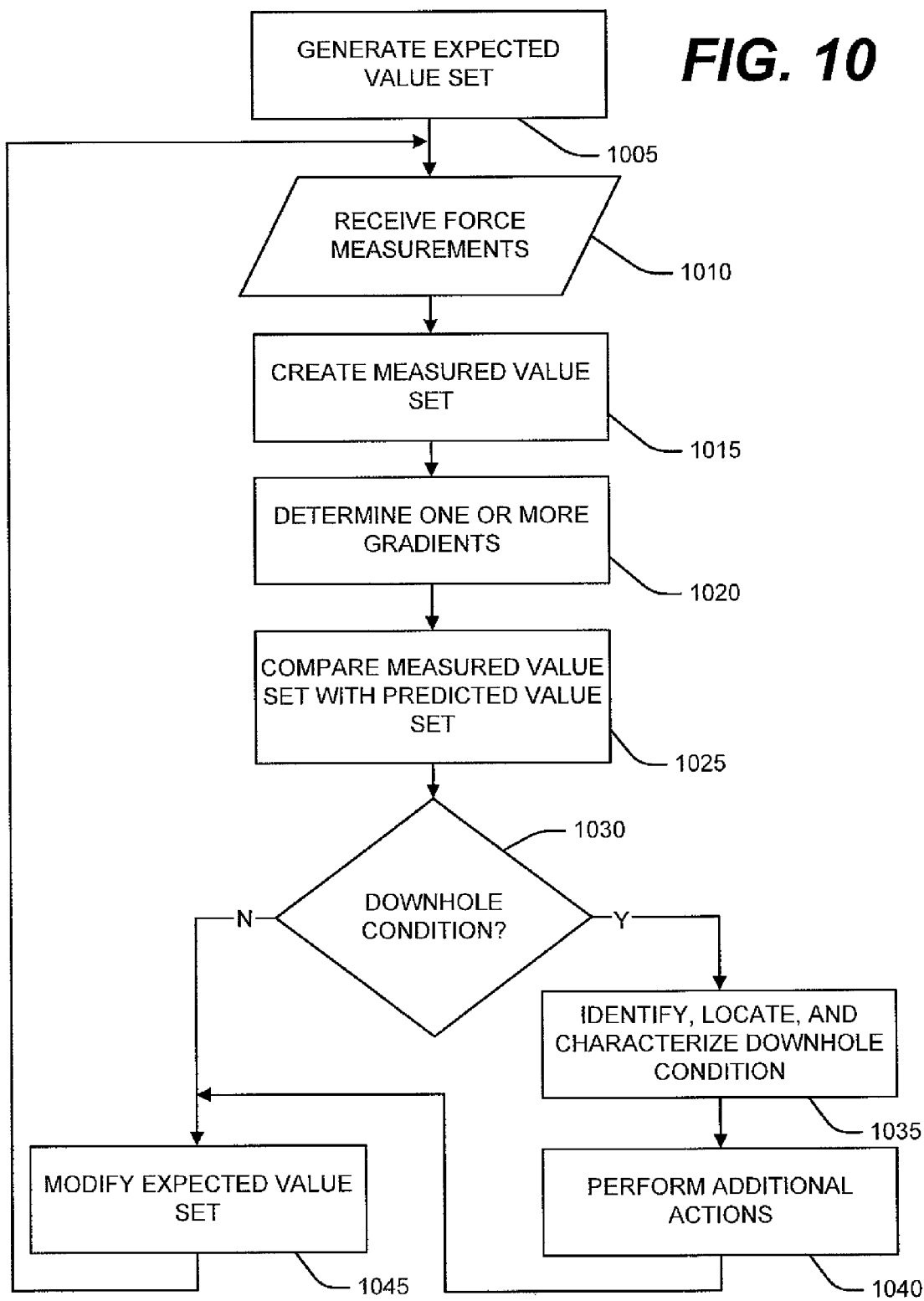
FIG. 10 shows a block diagram of a system for detecting at least one downhole condition.

An example system for detecting downhole conditions based on one or more force measurements from one or more force sensors 175 is shown in FIG. 10. The processor 180 generates an expected value set of expected force values (block 1005). The processor 180 receives one or more force measurements from the force sensors 175 (block 1010). The processor 180 may create a measured-value set from the force measurements received and may determine one or more measured-value gradients (blocks 1015 and 1020). The processor 180 may compare the measured force profile with the expected force profile (block 1025) to detect a downhole condition. If the processor detects a downhole condition (block 1030, which is shown in greater detail in FIG. 13), it may identify, locate, and characterize the downhole condition (block 1035, which is shown in greater detail in FIG. 14). The processor 180 may perform further actions (block 1040). Regardless of whether the processor 180 detects a downhole condition (block 1030), it may modify the expected-value set (block 1045) and may return to block 1010.

Creating the set of expected force values (block 1005) may include receiving one or more expected forces from an external source (e.g., a user, a database, or another processor). Creating the expected-value set may include accessing simulation results such as modeling results. The modeling to create the expected force values may include torque-and-drag modeling. The torque-and-drag modeling may consider one or more of the following: mechanical and other properties of the borehole and drillstring, fluid properties, operations in-process, previous force measurements from the borehole 165 or other boreholes, or other measurements. The torque-and-drag modeling may consider the dimensions and material properties of the drillstring elements. The torque-and-drag modeling may consider borehole survey data. Other modeling may be used in creating the expected-force value set, including hydraulics modeling. Other measurements may also be used in creating the expected-force value set, including pressure measurements from one or more of the standpipe 196, points along the drillstring, or points along the borehole 165. In some implementations, an expected-value set may be created by copying one or more values from a measured-value set. In other implementations an expected-value set may be created by using values from a measured-value set and adjusting or operating upon the values in accordance with an algorithm or model. Some implementations utilizing measured-value sets to create one or more expected-value sets may use measured-value sets from a recent time window, an earlier time window, or multiple time windows. Certain example expected-value sets may be derived from trend analysis of measured-value sets, such trends being observed or calculated in reference to, for example, elapsed time, circulation time, drilling time, depth, another variable or combinations of variables.

The expected-value set may include one or more force values at one or more depths in the borehole 165. The depths may be locations of interest within the borehole 165. A set of expected values may be provided or determined corresponding to all or a portion of the drillstring path within the borehole 165.

Each expected-value set may represent one or more force profiles. A force profile may include a set of two or more forces, and a set of two or more depths, or ranges of depths, where each force corresponds to a depth or a range of depths. The force profiles may exist, may be measurable, and may be modelable along the borehole 165.

Example force profiles may include one or more drillstring axial force profiles which may represent tension or compression in the drillstring, or both. Other example force profiles may include one or more borehole-drag profiles. Borehole-drag profiles may represent the forces associated with the borehole resisting axial movement of the drillstring, and may depend upon one or more of friction profile between borehole and drillstring, drillstring dimensions and buoyant weights, borehole path and angles, hook load, and other factors. Borehole-drag profiles may include static drag (i.e., the force to be overcome to move) or dynamic drag (i.e., the force resisting movement while moving). Borehole-drag profiles may be calculated or modeled using axial force profiles. Other example force profiles may include drillstring torque profiles, which may represent the torque at points along the drillstring reflecting torque sources and reaction points including one or more of: the surface rotary drive, the bit-rock interaction, a mud motor, the drillstring-borehole interaction, and other sources or reaction points. Other example force profiles may include borehole-torque profiles, which may represent the forces, acting upon a moment arm, resisting the rotation of the drillstring. Borehole-torque profiles may depend upon one or more of: the friction profile between borehole and drillstring, the drillstring dimensions and buoyant weights, the borehole path and angles, the hook load, and other factors. Borehole-torque profiles may include static torque (i.e., the torque to be overcome to begin rotation) or dynamic torque (i.e., the torque resisting rotation while rotating). Borehole-torque profiles may be calculated or modeled using one or more of axial force profiles and drillstring torque profiles. Example force profiles may include arithmetic or other combinations or superposition of profiles.

Expected force values, or an expected force value set, may be derived from a current (e.g., most recently acquired) set of one or more measured forces, a current measured force set, or a current measured force gradient. The processor 180 or the user may derive the expected force values from these one or more measured forces or measured force gradients by extrapolating a measured gradient covering a particular depth range to a larger depth range. Likewise, the processor 180 or the user may perform such a derivation by interpolating between two measured gradients.

While drilling the borehole 165, the processor 180 may change the expected-value set to reflect changes in the well. For example, the processor 180 may change the expected-value set to reflect drilling progress (e.g. increasing depth). The processor 180 may change the expected-value set to reflect the length and properties of drillstring. The processor 180 may alter the expected-value set to account for one or more known or unknown drilling process events or conditions. Changes to the expected-value set may be consistent or inconsistent with modeling, forecasts, or experience.

When generating the expected-value set, the processor 180 may consider one or more factors impacting force on the drillstring including the dimensions of the drillstring (e.g., inner and outer diameters of joints or other portions of the drillpipe and other drillstring elements), survey path and angles of borehole 165, and dimensions of the borehole 165. The processor 180 may also consider one or more depths corresponding to one or more measured forces within the borehole 165 or the drillstring. The processor 180 may consider drilling fluid properties (e.g., flow rates, densities) and whether one or more portions of the borehole 165 are cased or open hole.

The processor 180 may be provided with or may calculate one or more depths when calculating the expected-value set. The depths may include one or more of the following: the true-vertical depth (TVD) (i.e., only the vertical component of the depth), and the measured depth (MD) (i.e., the direction-less distance from the start of the borehole or other reference point chosen such as ground level, sea level, or rig level, to the bottom of the borehole or other point of interest along the borehole). The processor 180 may be provided with planned or measured survey station data (e.g., the inclination and azimuth) for one or more points along the well path, with corresponding MD or TVD depths, and the processor 180 may use the survey station data to calculate a well path. The well path may include inclinations and azimuths for some or all points of the well, which may be derived from one or more of actual data inputs at survey stations or interpolations between.

The processor 180 may generate one or more expected-value sets for different drilling process operations. For example, the processor 180 may generate one or more expected-value sets for pick-up, slack-off, sliding, rotary drilling with weight-on-bit, sliding drilling, back-reaming, tripping, and for the case where the drillstring is rotating off-bottom. The processor may consider data or planned values for operational parameters such as hook load, rotary RPM, rotary torque, downhole weight-on-bit, downhole torque-on-bit, mud motor pressure drop, or other operational parameters. The mud motor pressure drop may be used to infer a downhole torque-on-bit. In certain implementations, the expected-value set is generated dynamically based on the current drilling process operation. In other implementations, different expected-value sets are generated for different drilling process operations. In other implantations, an expected-value set is created for one drilling process operation and modified for other drilling process operations.

Figure 11:
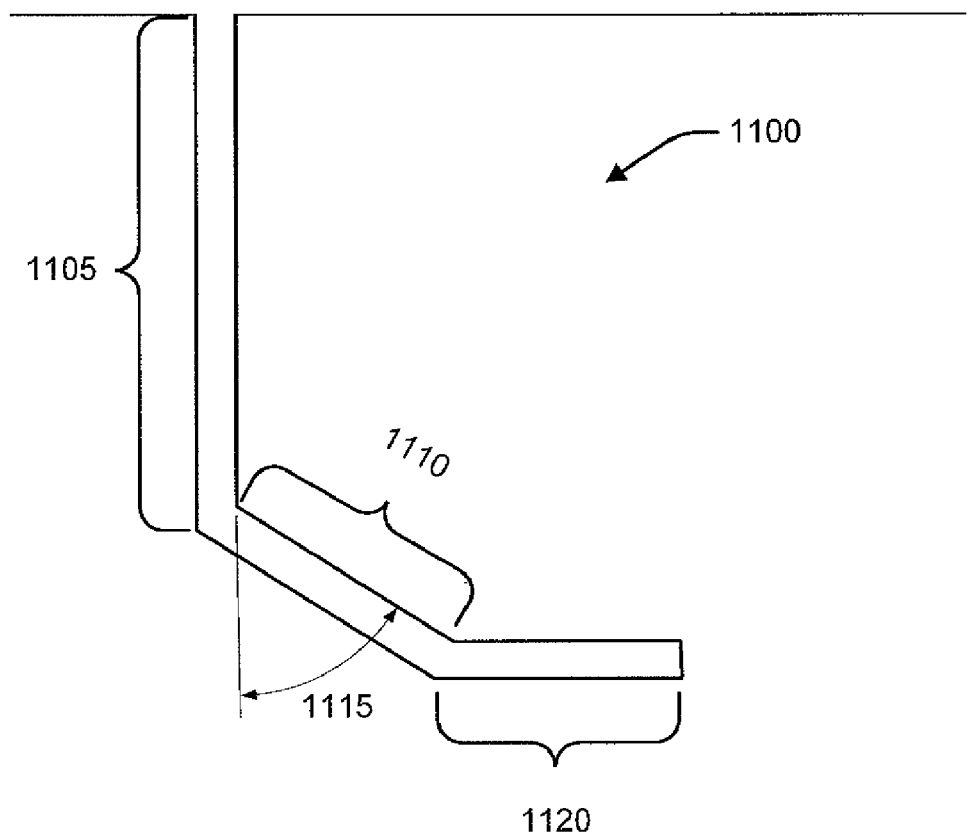
FIG. 11 illustrates a borehole.

An example borehole 1100 that may be modeled by the processor 180 is shown schematically in FIG. 11. The borehole 1100 includes a vertical segment 1105, a "tangent section" segment 1110 disposed to the vertical portion 1105 at inclination angle 1115, and a horizontal segment 1120. A borehole 1100 with a cased vertical segment 1105 of 3000 feet, an uncased segment 1110 of 3000 feet, an inclination angle 1115 of 60 degrees, and an uncased horizontal segment 1120 of 1800 feet will serve as the basis of upcoming examples. This example borehole description is simplistic, but demonstrative for purposes of discussing examples of the system. Between the vertical and tangent sections, and between the tangent and horizontal sections are assumed to be smooth curves, but they are not shown for simplicity. Actual boreholes may include other geometric features including azimuthal curvatures. Curve sections, in one or both of inclination and azimuth, may form transitions between straight segments or the curve sections may take the place of one or more straight segments. Other example boreholes may include complex well paths. Other borehole features may be considered when modeling the borehole 165. Such features may include hole diameters, formation types, casing type, borehole tortuosity, friction factors, and mud type. An example drillstring may be modeled by the processor 180 within example borehole 1100. The modeling may include one or more intervals of drillstring elements (e.g. drillpipe, collars, MWD tools) of one or more unit weights (e.g. pounds per foot), and one or more dimensions (e.g. outer diameters). A simple example drillstring which may be modeled may be predominantly composed of multiple joints of a single weight drillpipe. Other example drillstrings may be modeled including several intervals of different weight drillpipe and collars, optionally with MWD tools, all with their own dimensions.

Figure 12:
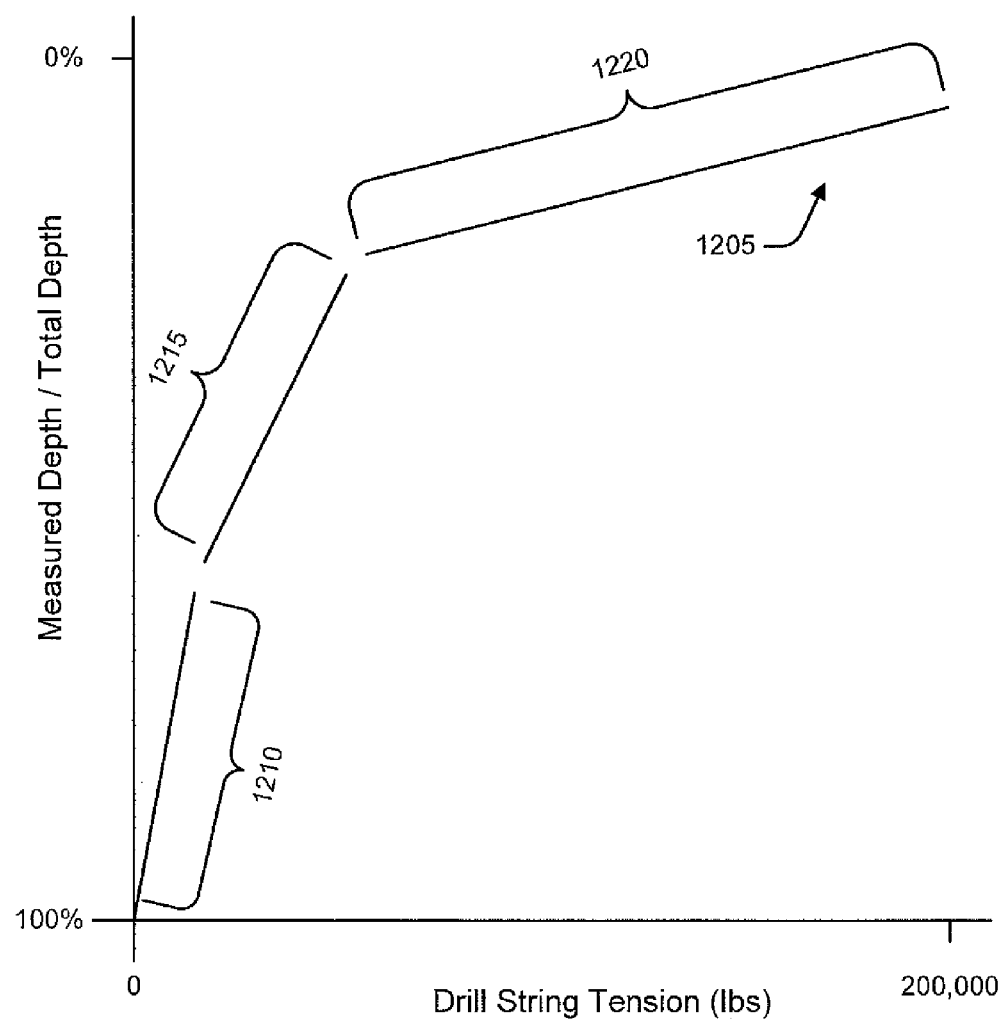
FIG. 12 illustrates a drillstring tension-versus-depth plots of a set of data.

An example expected-value set based on borehole 1100 having dimensions described above is shown in FIG. 12. The lines shown in FIG. 5 may represent underlying data points (e.g., tension-versus-depth). This example expected-value set assumes that the drillstring is engaged in pick-up. The expected value set is shown piecewise for each of the corresponding borehole segments and the interface between the portions (i.e., segments 1210, 1215, and 1220) of the expected-value set is not shown in the graph. In certain implementations, the curve sections between the portions may be generated. The expected-value set 1205 shows drillstring tension versus the percentage of measured depth to the total depth of the drillstring in the borehole. Segment 1210 represents the drillstring tension through the borehole segment 1120. Segment 1215 represents drillstring tension through the 60 degree borehole segment 1110. Segment 1220 represents drillstring tension in the vertical segment 1105.

Returning to FIG. 10 and referring to system elements shown in FIG. 1, once the drillstring has entered to the borehole 165, the processor 180 receives force measurements from one or more force sensors 175 (block 1010). The processor 180 creates a measured-value set (block 1015). The processor 180 may determine one or more measured-value gradients (i.e., the change in measured force-versus-depth). Certain example implementations include at least three force sensors 175 to provide at least two gradients. Certain example implementations include at least one gradient corresponding to each of at least two sections of the drillstring or borehole, such sections corresponding, for example, to: (a) ranges of hole angle (e.g. vertical, curve, tangent, horizontal sections); (b) lengths of common drillstring element type (e.g. over collars, over heavyweight pipe, over drillpipe); (c) lengths of different casing diameters or hole diameters; (d) lengths of borehole exposure to one or more particular formation types; or (e) cased versus open hole.

In certain example implementations, the processor may not determine the one or more gradients (block 1020). For example, if the processor 180 is detecting at least one downhole condition which can be detected by observing absolute differences between one or more measured forces, or between one or more measured forces and one or more expected forces, it may not determine the one or more gradients.

The number and location of the force sensors 175 may affect the number of force-versus-depth data points available in the measured-value set. Additionally, a force sensor 175 that is moved from one location to another (e.g. during drilling or tripping) may provide multiple data points in a measured-value set.

Certain example implementations may include the creation of a measured-value set (block 1015) inclusive of one or more force measurements from surface sensors not actually on the drillstring, as described earlier. In such implementations one or more force measurements (e.g. tension, torque) corresponding to the top of the drillstring may be inferred from the surface sensor force measurements. At least two force-versus-depth data points may be used to determine a measured-value gradient. Where actual force-versus-depth data points are not available, the processor 180 may estimate one or more force-versus-depth data points. The processor 180 may estimate force-versus-depth data points by interpolating between data points, extrapolating gradients, or determining transitions between gradients.

In certain example system, the measured-value set of forces (e.g., measured tension/compression or torque values), the expected-value set of forces (e.g., expected tension/compression or torque values), or both may be displayed to the operator using the terminal 185. For example, the measured-value set may be juxtaposed to the expected-value set using the terminal 185, allowing the user to manually detect, identify, characterize, or locate a downhole condition. The measured-value sets and the expected-value sets may be presented to the user in a graphical format (e.g., a chart, log, plot, or series of plots) or in a textual format (e.g., a table of values). Certain example systems may include presenting an evolution of one or more of the measured-value sets and the expected-value sets to the user. For example, the system may display a series of plots to the user to demonstrate the evolution of one or more of the measured-value sets and the expected-value sets. The system may display an evolution of both the measured-value set and the expected-value set. Certain evolutions may be evolutions over time, depth, or other variables or combinations of variables.

Individual measured forces (e.g., tensions/compressions or torques) in the measured-value set may be measured in a short time window (e.g. seconds) for minimized delay in detecting of conditions. In many implementations individual measured forces in the measured-value set may be measured substantially simultaneously. As used herein, "substantially simultaneously" means only that the measurements are taken in the same time period during which conditions are not expected to change significantly, in the context of the particular operational process. Many downhole conditions (e.g., cuttings build-up) may be detected using measured-value sets, the values of which are obtained in a time window of minutes. During transient operational processes such as tripping, and for detection of events or conditions which have a faster time constant, a shorter time window for collecting and analyzing a measured-value set may be preferred. Individual measured forces along the drillstring in the measured-value set may be measured in a short time window (e.g. within a second or less), and such short-time-window measurement process may then be repeated one or more additional times during a larger time window of seconds to minutes. An averaged measured-value set may be created from averaging the multiple values for each force sensor. Other statistics may be developed for each measured force in the measured-value set. The statistics may include, for example, minimum and maximum values and standard deviation. Averaged values, optionally in conjunction with further statistics, may be preferred for use during certain operational processes in which conditions are anticipated to have a dynamic element (e.g. stick or slip during drilling).

Individual measured forces in the measured-value set may be measured sequentially. In some example implementations, the sequence by which the forces are measured may be controllable by, for example, the processor 180. For example, the sequence by which the forces are measured may be determined by an algorithm based on drilling conditions or other factors.

Example systems may provide measured versus expected forces, profiles, or gradients in different operational processes of well construction, including, for example and without limitation: on-bottom rotary drilling, sliding, tripping, off-bottom circulating, circulating up a kick, circulating pills or transitioning mud types, picking up, and slacking off.

Figure 13:
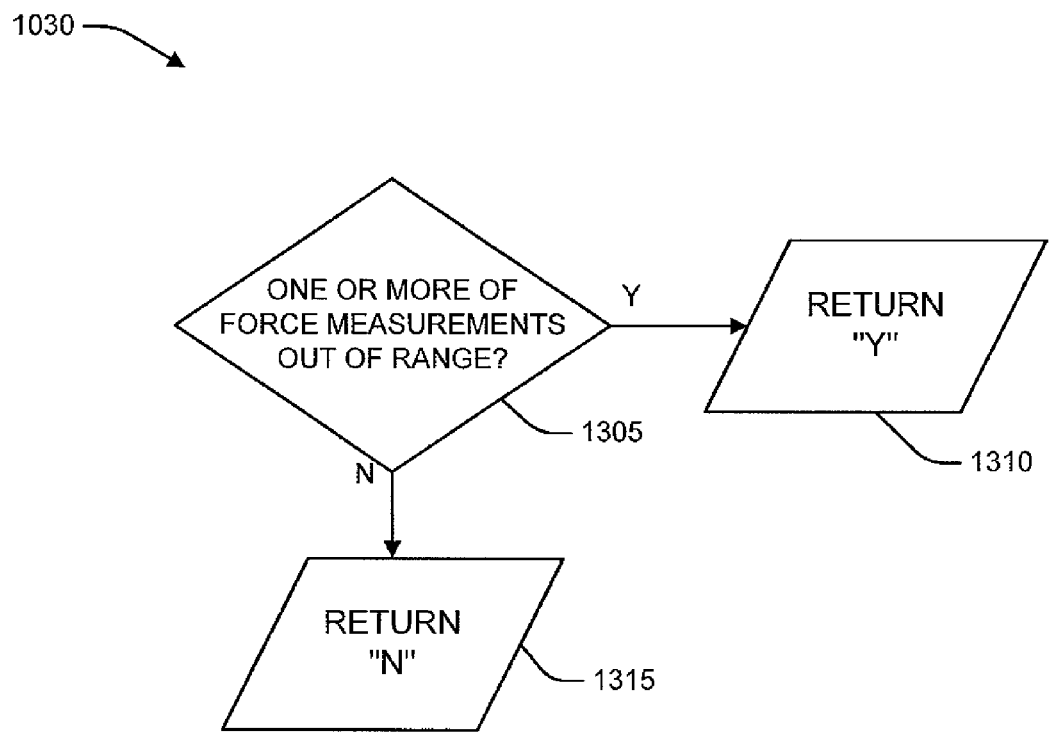
FIG. 13 shows a block diagram of a system for detecting at least one downhole condition.

An example system for determining if there is a downhole condition (block 1030) is shown in FIG. 13. In general, a downhole condition may include any regular or irregular, static or dynamic, condition or event along the drillstring or in the wellbore. Example downhole conditions may include, but are not limited to, one or more of the following: a borehole deviation, a hole restriction, a cuttings build-up, differential sticking, a wash-out, or an influx. The processor 180 may determine if one or more force measurements are out of range (block 1305), and if so it returns "Y" (block 1310), otherwise it returns "N" (block 1315).

The processor 180 may determine whether any of the quantities are out of range (blocks 1305) by determining if the difference between the measured property (e.g., measured tension/compression, toque, tension/compression gradient, or torque gradient) and the expected property (e.g., expected tension/compression, torque, tension/compression gradient, or torque gradient) is greater than a maximum delta for the property.

In certain implementations, the maximum delta may be determined automatically by the processor 180. In other implementations the maximum delta may be input by an operator. In other implementations, the maximum delta may be obtained from a separate processor or model. In certain implementations, the maximum delta may be determined by an operator or an independent model based on one or more measured forces.

The maximum delta determination may be based on an absolute difference versus an expected value, or it may be based on a percentage deviation from the expected value. The maximum delta may be based upon a function. For example, the maximum delta may increase or decrease with depth. The maximum delta may vary over a depth range or over an operational phase. The maximum delta determination may also be dependant on time. In certain implementations, a difference between a measured force and an expected force exceeding the maximum delta may be not be acted on unless it persists for a particular duration or longer. The maximum delta may include one or more statistical criteria, for example it may include a mean, average, or standard deviation of collected deltas over a chosen duration.

Returning to FIG. 10, if the processor 180 determines that there is not a downhole condition (block 1030) it may modify the expected-value set (block 1045) and return to block 1005. In certain implementations, the processor may not execute block 1045 without operator input (e.g., review, approval, input, or intervention). In other implementations, block 1045 may be executed without operator intervention. In one example system, the processor 180 modifies the expected-value set based on more or more parameters or parameter sets (e.g. actual force gradients) observed or measured downhole.

Such an update may provide accounting in the new expected-value set for new or updated circumstances (e.g. increased hole depth, added joint of drillpipe, changed hook-load, changed fluid density, changed rotary RPM, and/or changed rate of penetration) which are not deemed downhole conditions (block 1030).

If the processor 180 determines that there is a downhole condition (block 1030), it may identify the condition (e.g. determine the type condition detected), it may characterize the downhole condition (e.g. determine the magnitude or other properties of the downhole condition), and it may locate the position of the downhole condition (e.g. determine the depth or depth interval of the detected condition) (block 1035), and it may take additional actions (block 1040).

Figure 14:
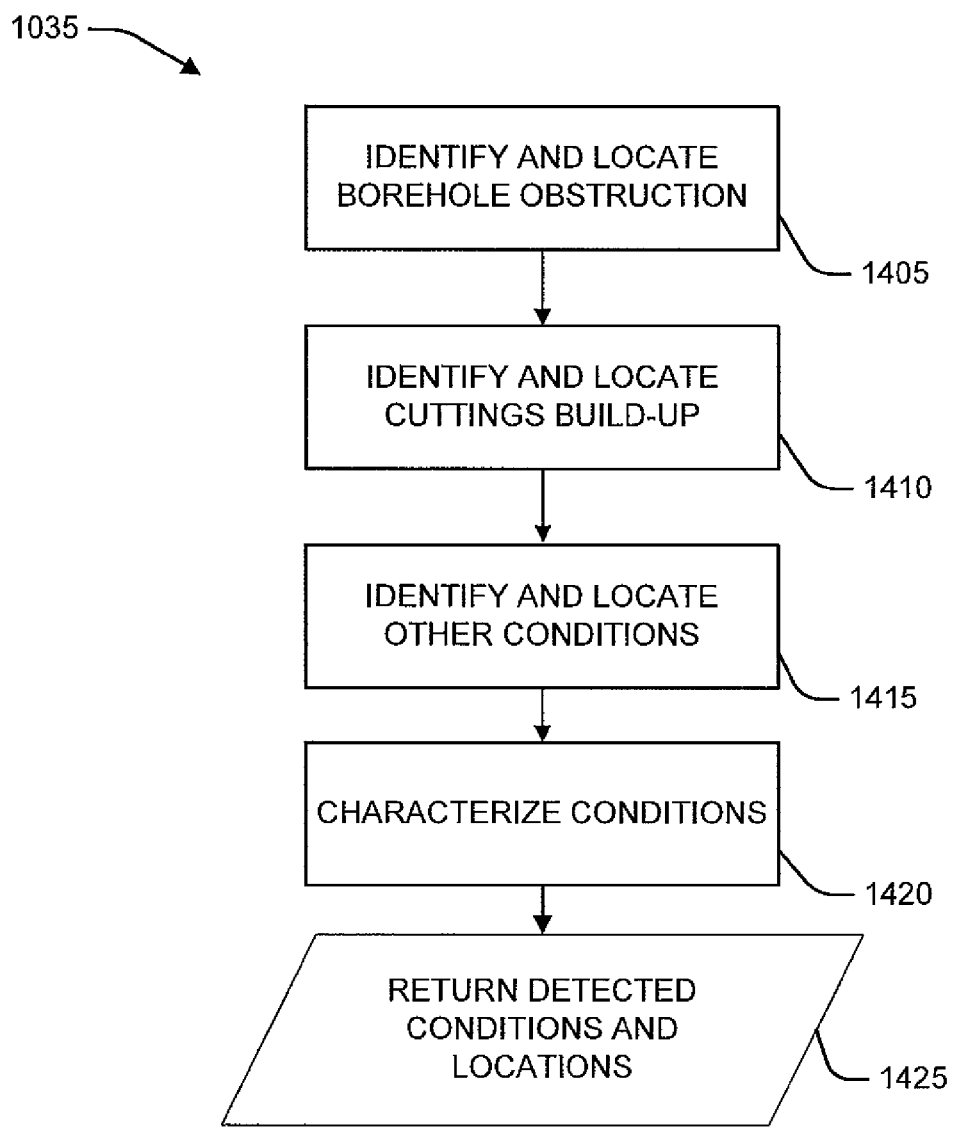
FIG. 14 shows a block diagram of a system for identifying, locating, and characterizing at least one downhole condition.

An example system for identifying, locating, and characterizing at least one downhole condition (block 1035) is shown in FIG. 14. The processor 180 may identify and locate a borehole deviation (block 1405). The processor 180 may identify and locate a cuttings build-up (block 1410). The processor 180 identify and locate other conditions (block 1415). The processor may characterize the identified conditions (block 1420). The processor may return one or more of the identification, location, and characteristics of detected downhole conditions (block 1425).

Figure 15:
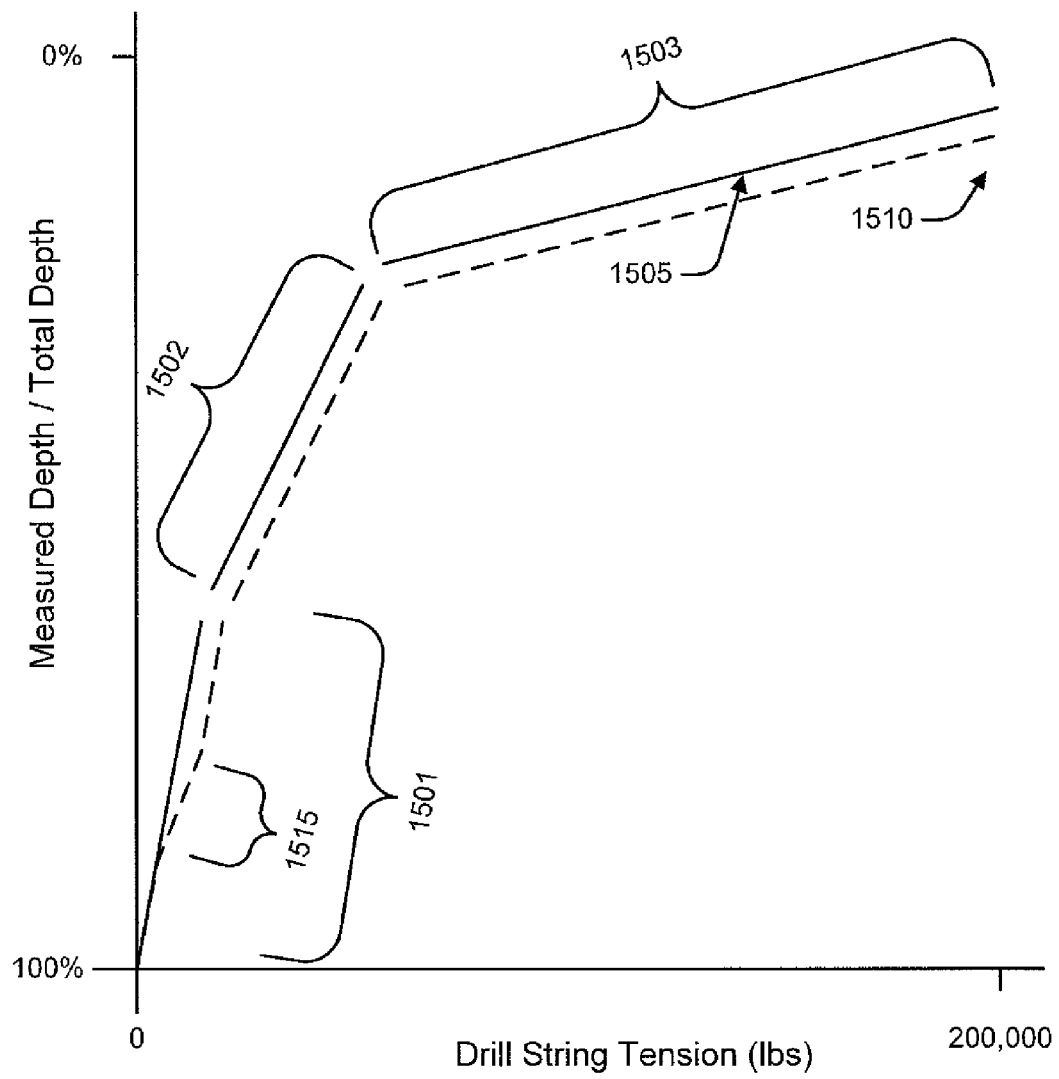
FIGS. 15-18 illustrate drillstring tension versus depth for value sets.

The identification and location of downhole conditions are demonstrated by reference to example expected- and measured-value sets in FIGS. 15-22. FIG. 15 shows an example expected-value set (1505) and an example measured value set (1510) of drillstring tension for a drillstring near bottom of the borehole, engaged in pick up. The vertical axis represents the borehole measured depth as a percentage basis of the total measured depth. The expected-value set (1505) may correspond to the borehole path of FIG. 11, and may represent drillstring tension values expected (e.g. from user input, modeling, or earlier measurements) along the drillstring length. More specifically, the expected-value set (1505) may represent:

near-zero tension expected at the bit;
an interval of an expected particular gradient (1501) representing increasing drillstring tension with increasing distance from borehole bottom, corresponding to the cumulative (from drillstring bottom) frictional drag along the portion of the drillstring in the horizontal hole section;
another interval of another expected particular gradient (1502) representing increasing drillstring tension with increasing distance from hole bottom, corresponding to: (a) the cumulative (from this interval's bottom) frictional drag along the portion of the drillstring in the tangent section, plus (b) the cumulative (from this interval's bottom) buoyant weight component of the drillstring supported from above by the drillstring itself (i.e. not supported by the borehole), plus (c) the offset corresponding to the total tension at the bottom of this tangent interval of drillstring resulting from the intervals below; and
a third major interval of third expected particular gradient (1503) of increasing drillstring tension with increasing distance from hole bottom, corresponding to: (a) the cumulative (from this interval's bottom) buoyant weight component of the drillstring supported from above by the drillstring itself (i.e. the hanging weight) along the vertical borehole section, plus (b) the offset corresponding to the total tension at the bottom of this vertical interval of drillstring resulting from the intervals below.

The offset difference in the expected-value set (1505) and measured value set (1510) may be indicative of a downhole condition. The divergence between the expected value set and measured value set over the range shown by 1515 may be indicative of the location of the downhole condition. The difference in the expected-value and measured-value gradient over the range shown by 1515 may be indicative of a cutting build-up in the mid-horizontal section 1120 of the borehole 1100. The processor 180 may observe the offset between the expected-value set and measured value set and may indicate existence of a likely downhole condition. The processor 180 may observe the divergence between the expected value set and measured value set over the range shown by 1515 and it may indicate a likely location of the downhole condition (around measured depth range of 1515). The processor 180 may observe this gradient difference and identify the condition as a likely cutting-build up.

The cuttings build-up in the mid-horizontal section may increase the frictional drag over the interval of cuttings build-up, thus increasing the tension gradient (i.e. the change in tension per change in measured depth) measured over that interval. An increased tension gradient (from any source) over an interval may tend to increase the overall tension load measured during pick-up measured at locations from that interval up to surface, which may result in an offset difference as also shown in FIG. 15. The processor 180 may further determine that the likely location of the cutting build-up is in the depth range corresponding to the diverging gradients between the measured- and expected-value sets (e.g., range 1515).

Figure 16:
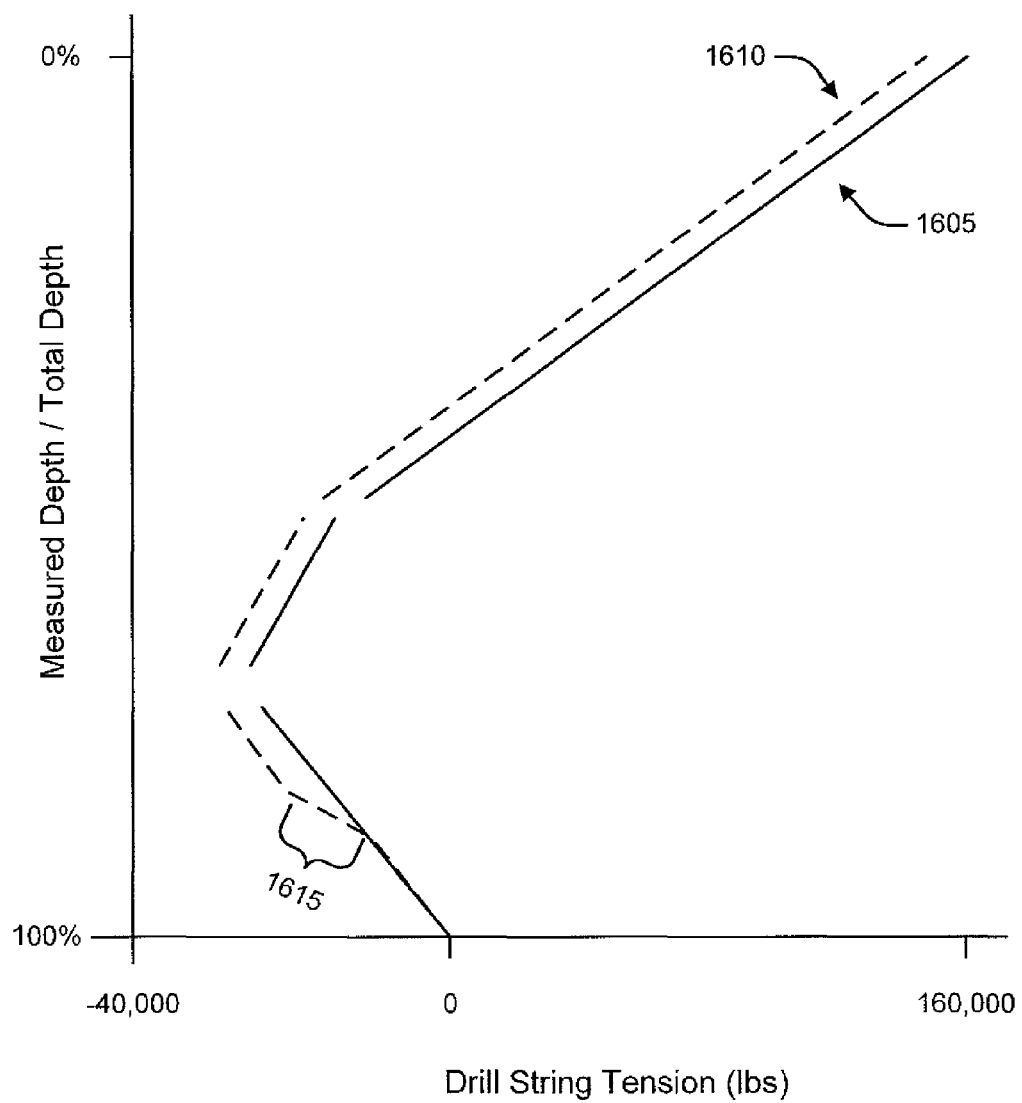

FIG. 16 shows an example expected-value set (1605) and an example measured value set (1610) of drillstring tension for a drillstring near bottom of the borehole engaged in slack off. The expected-value set may result from modeling, user input, or measuring in a similar manner to the expected-value set determination associated with FIG. 15. In certain wellbore geometries, such as horizontal sections, the expected drillstring tension values may be negative (e.g., indicating. compression) in certain drillstring intervals during operations such as slack off. The existence of an offset difference between the expected-value set (1605) and measured value set (1610) may be indicative of a downhole condition. The divergence between the expected value set and measured value set over the range shown by 1615 may be indicative of the location of the downhole condition. The difference in the expected-value and measured-value gradients over the range shown by 1615 may be indicative of cuttings build-up in the mid-horizontal section 1120 of the borehole 1100. The processor 180 may observe the offset between the expected-value set and measured value set and may indicate existence of a likely downhole condition. The processor 180 may observe the divergence between the expected value set and measured value set over the range shown by 1615 and it may indicate a likely location of the downhole condition (around measured depth range of 1615). The processor 180 may observe this gradient difference and identify the condition as a likely cutting-build up. The processor 180 may further determine that the likely location of the cutting build-up is in the depth range corresponding to the diverging gradients between the measured- and expected-value sets (e.g., range 1615).

Figure 17:
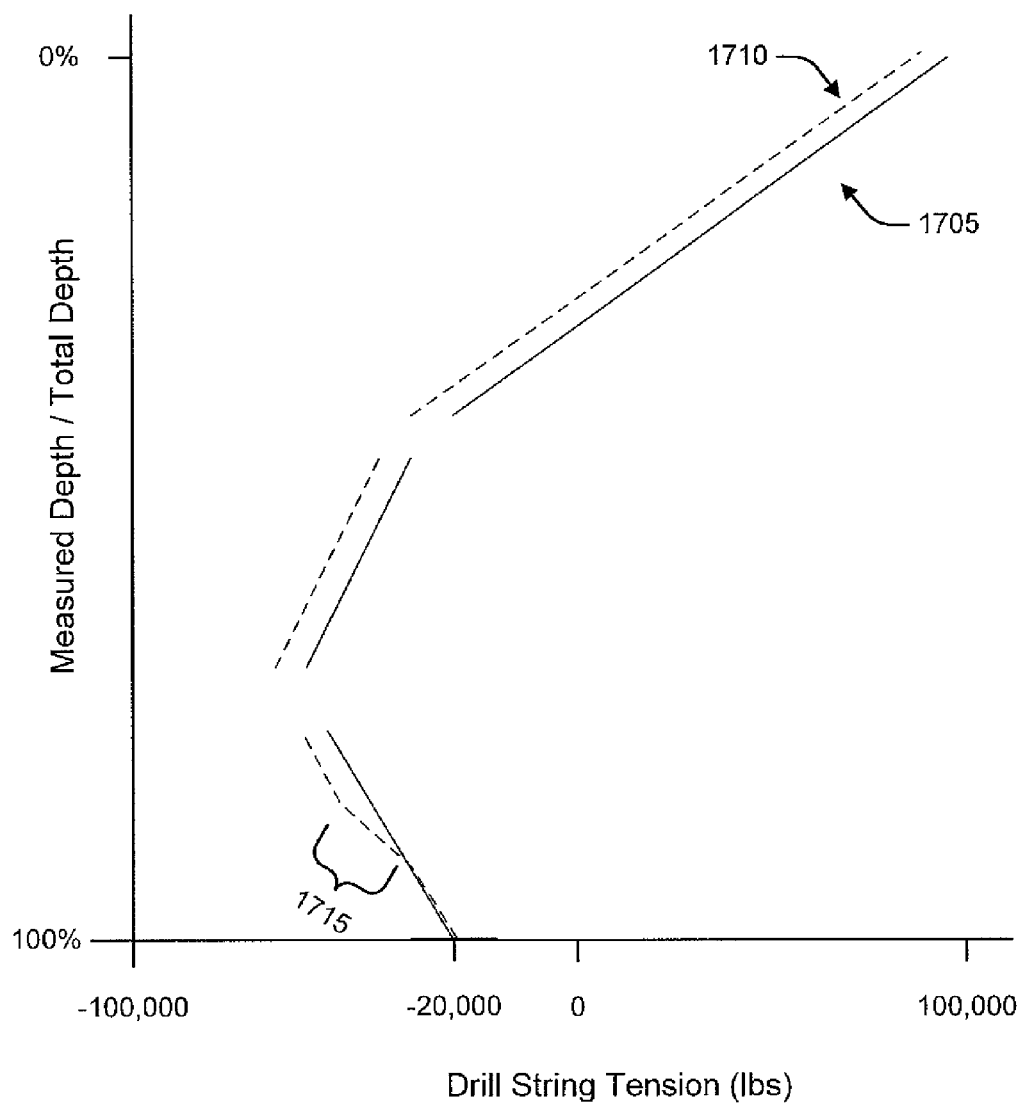

FIG. 17 shows an example expected-value set (1705) and an example measured value set (1710) of drillstring tension for a drillstring engaged in sliding, for example during directional drilling. Often in directional drilling, the driller will slack off as required to obtain a sufficient downhole weight-on-bit to drill. The sufficient downhole weight-on-bit may be determined and controlled indirectly by, for example, monitoring a standpipe pressure increase corresponding to a desired mud motor torque or by monitoring the rate of penetration. The sliding operation of FIG. 17 is similar to the slack off operation of FIG. 16, with the addition of weight (i.e. drillstring compression) on bit. The measured value set of FIG. 17 may be obtained while sliding drilling. As in the slack off discussion, the existence of an offset difference between the expected-value set (1705) and measured value set (1710) may be indicative of a downhole condition. The divergence between the expected value set and measured value set over the range shown by 1715 may be indicative of the location of the downhole condition. The difference in the expected-value and measured-value gradients over the range shown by 1715 may be indicative of cuttings build-up in the mid-horizontal section 1120 of the borehole 1100. The processor 180 may observe the offset between the expected-value set and measured value set and may indicate existence of a likely downhole condition. The processor 180 may observe the divergence between the expected value set and measured value set over the range shown by 1715 and it may indicate a likely location of the downhole condition (around measured depth range of 1715). The processor 180 may observe this gradient difference and identify the condition as a likely cutting-build up. The processor 180 may determine that the likely location of the cutting build-up is in the depth range corresponding to the diverging gradients between the measured- and expected-value sets (e.g., range 1715).

Figure 18:
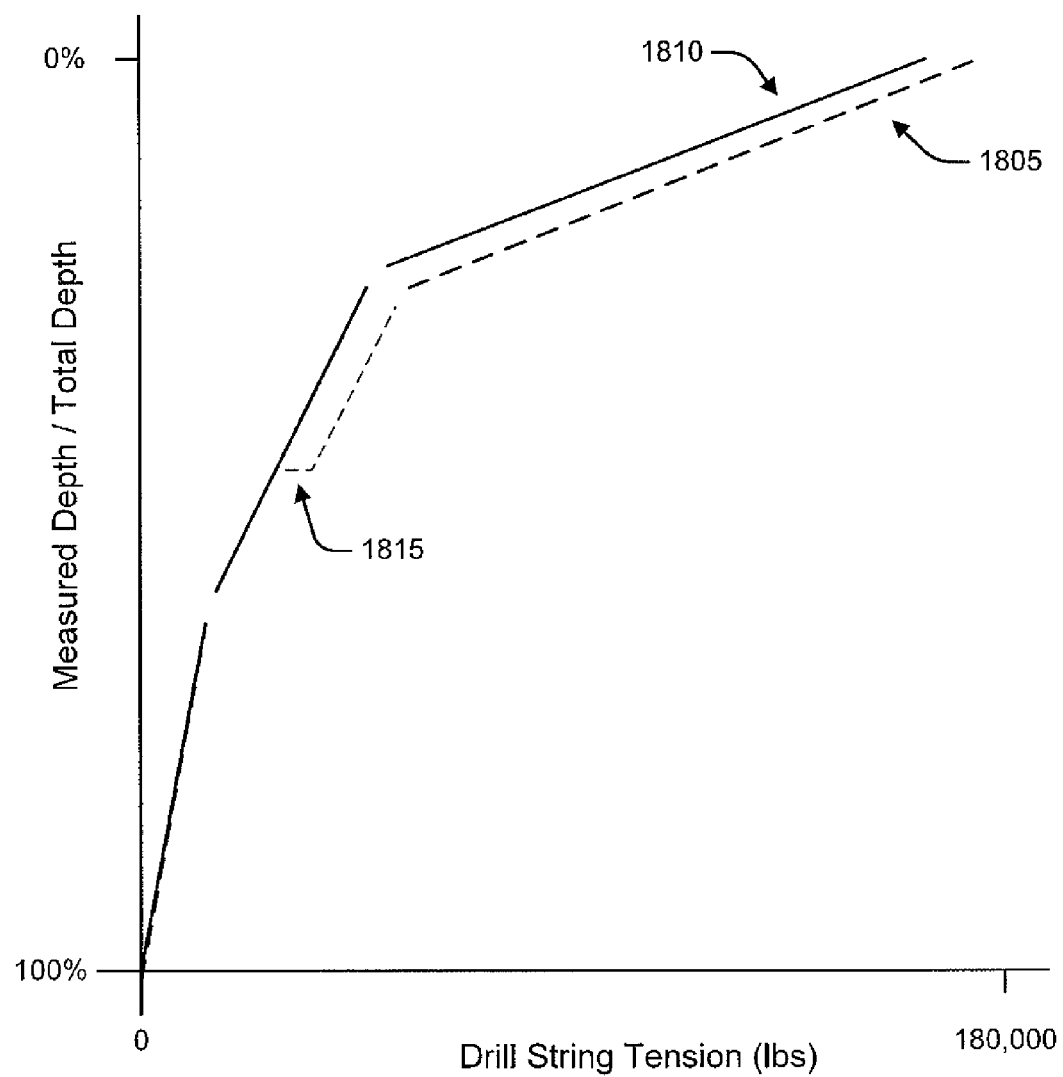

FIG. 18 shows an example expected-value set (1805) and an example measured value set (1810) of drillstring tension for a drillstring engaged in pick up. As in the discussion of pick up with respect to FIG. 15, the existence of an offset difference between the expected-value set (1805) and the measured value set (1810) may be indicative of a downhole condition. The divergence between the expected value set and measured value set over the range 1815 may be indicative of the location of the downhole condition. However, in contrast to the pick up discussion relating to FIG. 15, the divergence between the expected- and measured-value sets occurs in a step-change at 1815. In certain situations, the step-change 1815 may not be as pronounced as the example shown in FIG. 18. The step-change in the expected-value and measured value sets at 1815 may be indicative of a borehole deviation in the tangent section 1110 of the borehole 1100. A borehole deviation may include any relatively short interval of deviation from the expected borehole cylindrical shape. Examples of possible borehole deviations include, for example, and without limitation: a deformed or damaged portion of casing, a borehole obstruction, a swelled shale, a sluffed-in hole section, a ledge, a large dog-leg, or a key-seat. The processor 180 may observe the offset between the expected-value set and measured value set and may indicate existence of a likely downhole condition. The processor 180 may observe the divergence between the expected value set and measured value set over the range shown by 1815 and may indicate a likely location of the downhole condition around the measured depth range of 1815. The processor 180 may observe this difference between the measured and expected drillstring tension to represent a step-change and identify the condition as a borehole deviation. The processor 180 may determine that the likely location of the borehole deviation at or about the depth corresponding to the step-change 1815.

Figure 19:
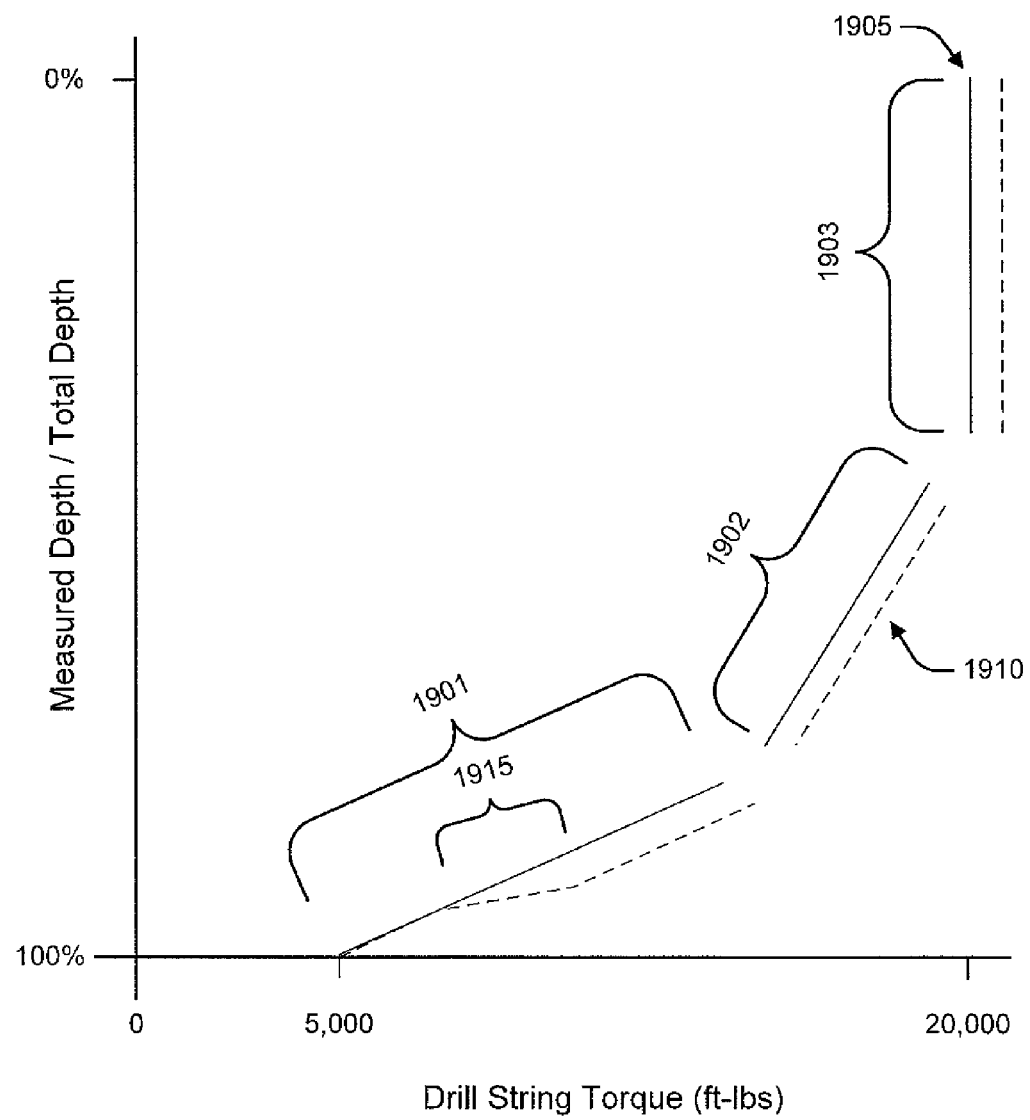
FIGS. 19-21 illustrate torque versus depth for value sets.

FIG. 19 shows an example expected-value set (1905) and an example measured value set (1910) of drillstring torque for a drillstring engaged in rotary drilling with about 5,000 foot-pounds of weight on bit. In contrast to the earlier plots (FIG. 15-18) the horizontal axis in FIG. 19 represents drillstring torque (not tension), and the expected-value set (1905) may represent drillstring torque values expected (e.g. input by a user, modeled, or measured earlier) along the drillstring length. More specifically, the expected-value set (1905) may represent:

expected torque-on-bit while rotary drilling (e.g., 5,000 foot-pounds);

an interval of an expected particular gradient (1901) corresponding to increasing drillstring torque with increasing distance from borehole bottom, corresponding to: (a) the cumulative (from drillstring bottom) torque consumed by the borehole (i.e. frictional borehole-torque) along the portion of the drillstring in the horizontal hole section, plus (b) an offset corresponding to the expected bit torque;

another interval of another expected particular gradient (1902) corresponding to increasing drillstring torque with increasing distance from hole bottom, corresponding to: (a) the cumulative (from this interval's bottom) frictional borehole-torque along the portion of the drillstring in the tangent section, plus (b) an offset corresponding to the total drillstring torque at the bottom of this tangent interval of drillstring resulting from the intervals below; and a third major interval of third expected particular gradient (1903) of increasing drillstring torque with increasing distance from hole bottom, corresponding to: (a) the cumulative (from this interval's bottom) frictional borehole-torque along the portion of the drillstring in the vertical section (expected in this example to be near zero in vertical section), plus (b) the offset corresponding to the total drillstring torque at the bottom of this vertical interval of drillstring resulting from the intervals below.

The offset difference in the expected-value set (1905) and measured value set (1910) may be indicative of a downhole condition. The divergence between the expected value set and measured value set over the range shown by 1915 may be indicative of the location of the downhole condition. The difference in the expected-value and measured-value gradient over the range shown by 1915 may be indicative of a cutting build-up in the mid-horizontal section 1120 of the borehole 1100. The processor 180 may observe the offset between the expected-value set and measured value set and may indicate existence of a likely downhole condition. The processor 180 may observe the divergence between the expected value set and measured value set over the range shown by 1915 and it may indicate a likely location of the downhole condition (around measured depth range of 1915).

The processor 180 may observe the gradient difference between the expected- and measured-value sets and identify the condition as a likely cutting-build up. Such cuttings build-up may increase the frictional drag over the interval of cuttings build-up, thus increasing the torque gradient (i.e. the change in torque per change in measured depth) measured over that interval. An increased torque gradient (from any source) over an interval would tend to increase the overall torque load measured during rotation measured at locations from that interval up to surface, which may result in an offset difference as also shown in FIG. 19. The processor 180 may further determine that the likely location of the cutting build-up is in the depth range corresponding to the diverging gradients between the measured- and expected-value sets (e.g., range 1915). The processor 180 may observe this gradient difference and identify the condition as a likely cutting-build up.

Figure 20:
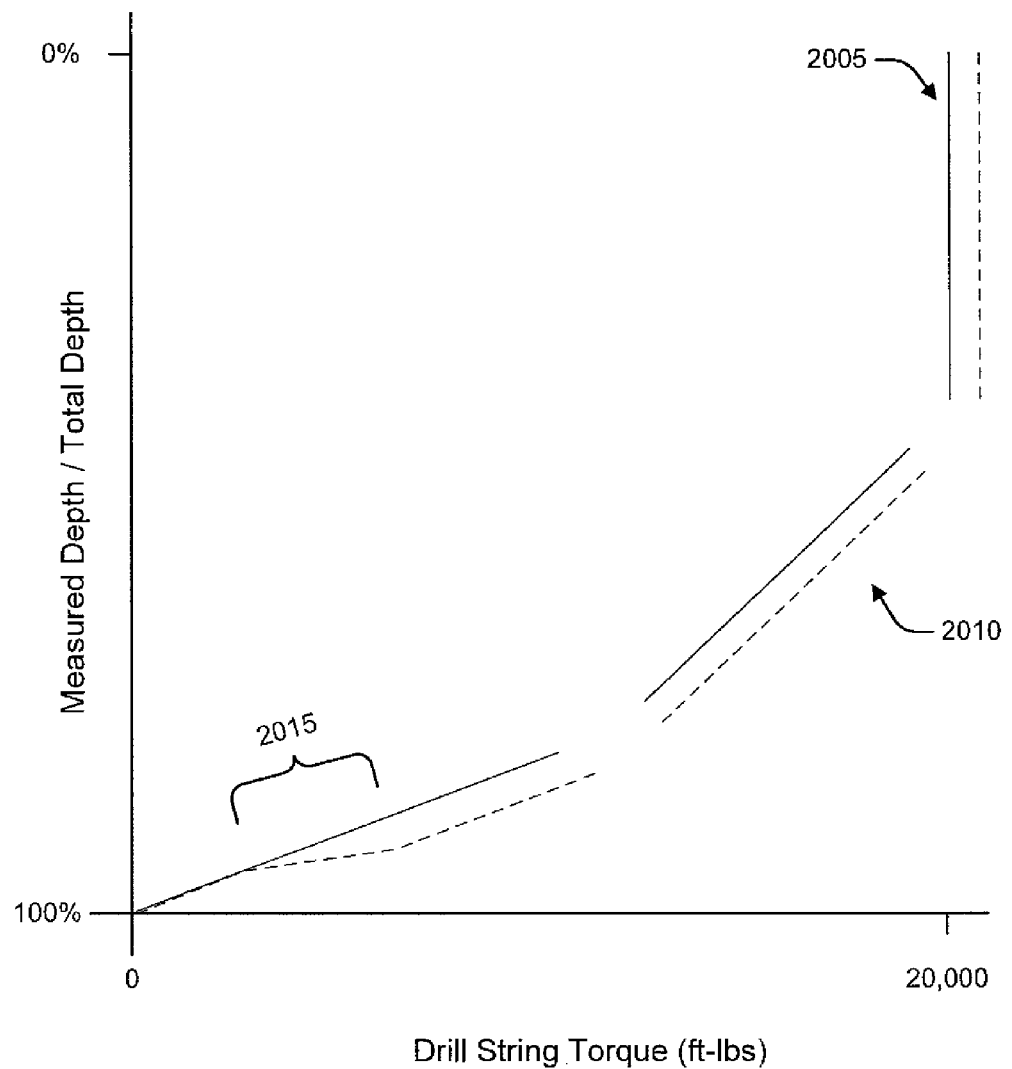

FIG. 20 shows an example expected-value set (2005) and an example measured value set (2010) of drillstring torque for a drillstring rotating off-bottom. Drillers sometimes pick up off bottom and rotate to observe the surface torque, or condition the hole. The FIG. 20 rotating off-bottom is operation is similar to the rotary drilling operation of FIG. 19, but without the weight-on-bit and associated torque of the bit/formation interaction. Similarly to the rotary drilling discussion, the existence of an offset difference between the expected-value set (2005) and measured value set (2010) may be indicative of a downhole condition. The divergence between the expected value set and measured value set over the range shown by 2015 may be indicative of the location of the downhole condition. The difference in the expected-value and measured-value gradients over the range shown by 2015 may be indicative of cuttings build-up in the mid-horizontal section 1120 of the borehole 1100. The processor 180 may observe the offset between the expected-value set and measured value set and may indicate existence of a likely downhole condition. The processor 180 may observe the divergence between the expected value set and measured value set over the range shown by 2015 and it may indicate a likely location of the downhole condition (around measured depth range of 2015). The processor 180 may observe this gradient difference and identify the condition as a likely cutting-build up. The processor 180 may determine that the likely location of the cutting build-up is in the depth range corresponding to the diverging gradients between the measured- and expected-value sets (e.g., range 2015).

Figure 21:
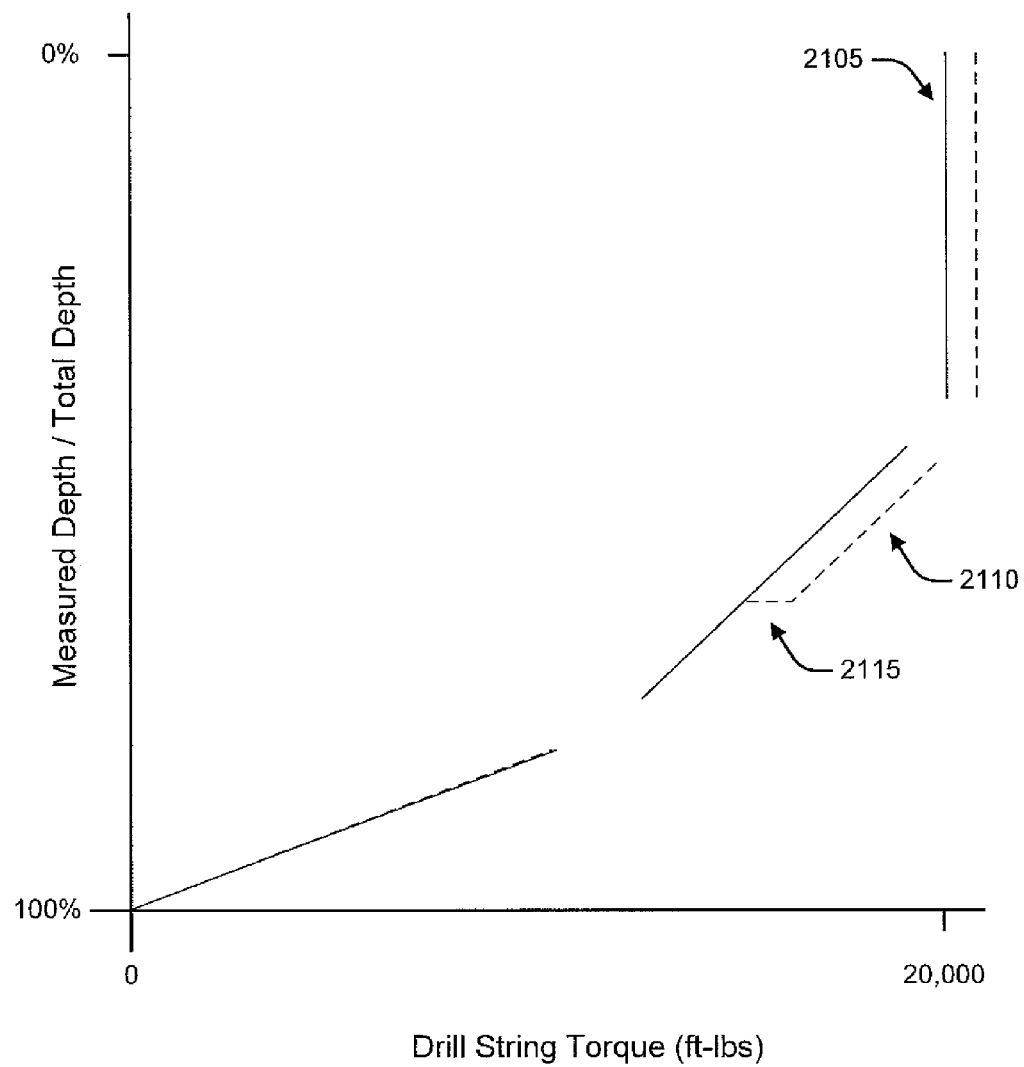

FIG. 21 shows an example expected-value set (2105) and an example measured value set (2110) of drillstring torque for a drillstring engaged in off-bottom rotation. Similarly to the earlier rotating off-bottom discussion relating to FIG. 20, the existence of offset difference between the expected-value set (2105) and measured value set (2110) may be indicative of a downhole condition. The divergence between the expected value set and measured value set over the range shown by 2115 may be indicative of the location of the downhole condition. However in contrast to the discussion relating to FIG. 20, the divergence between the expected- and measured-value sets occurs in a step-change at 2115. In certain situations, the step-change 2115 may not be as pronounced as the example shown in FIG. 21. The step-change in the expected-value and measured value sets at 2115 is indicative of a likely borehole deviation in the tangent section 1110 of the borehole 1100.

The processor 180 may observe the offset between the expected-value set and measured value set and may indicate existence of a likely downhole condition. The processor 180 may observe the divergence between the expected value set and measured value set over the range shown by 2115 and it may indicate a likely location of the downhole condition (around measured depth range of 2115). The processor 180 may observe this difference between the measured and expected drillstring torque to represent a step-change and identify the condition as a borehole deviation. The processor 180 may determine that the likely location of the borehole deviation at or about the depth corresponding to the step-change 2115.

The downhole conditions may also be characterized by the processor 180 (block 1420). Such characterization may include the determination of a likely magnitude range of the condition. The magnitudes of the measured and expected force values and measured and expected-value gradients may be indicative (e.g., analytically through known relationships or empirically) of the characteristics of the condition. For example, the particular changes in forces or gradients may be used to estimate a revised effective friction factor for an interval. A particular change in forces or gradients may be used to estimate a particular percentage volume or cross sectional area of borehole filled in by cuttings in a cuttings bedded interval. In other examples, processor 180 may characterize the interval length of a borehole deviation such as a swelling shale. In yet other examples, the processor 180 may characterize the criticality (e.g. from a drill string integrity standpoint) of a borehole deviation such as a keyseat or severe dogleg. The processor 180 may use additional force data from force sensors along the drillstring, such as bending forces, in certain characterizations.

The processor 180 or the user may use a combination of measured force types in detecting, identifying, locating, or characterizing one or more downhole conditions. For example, the processor 180 or the user may use one or more of the following to detect, identify, locate, or characterize a downhole condition: the measured tensile force data and associated expected data, and measured torque data and associated expected data, tensile force and torque gradients and respective gradient differences. As can be seen from FIGS. 15 and 20 for example, a single condition (cuttings build-up in the horizontal in these two examples) may result in measured tensile force data sets, and measured torque data sets, which correlate with each other. The processor 180 or the user may use torque and tension data together to provide greater assurance of the detection, identification, locating, or characterizing of a downhole condition. Similarly, the processor 180 or the user may correlate the same measured force type (e.g. tension), as measured in different but sequential operational process (e.g. pick-up and slack-off).

The processor 180 may use other data from drilling rig site sensors and drillstring sensors to detect, identify, locate, or characterize one or more downhole conditions. For example, pressure sensor measured value sets from pressure sensors along the drillstring and expected pressure value sets, differences between the pressure sets, gradients of respective pressure sets, and pressure gradient differences, may for certain downhole conditions be depth-correlated with respective force sensor value sets, their differences, gradients, and gradient differences. In another example, formation log data (e.g. from an MWD/LWD tool 150 being run on the drillstring) may be depth correlated with certain downhole conditions. For example, as discussed with respect to FIG. 21, an increased torque versus expected torque may be detected in a short interval, indicating and locating a likely borehole deviation. Continuing with the example, the addition of MWD/LWD gamma ray log data may provide specific indications of a shale at a the same depth of the condition. The condition then may be identified with greater confidence as a swelling shale rather than another type of borehole deviation.

Certain additional downhole conditions may be detected, identified, located, or characterized by similar techniques. Example conditions that may be detected are lost circulation, which may cause mild differential sticking (i.e. not to the point of a stuck drillstring) or a stuck drill sting. Multiple force measurements may be made along the drillstring, and compared to expected values, in the process of getting a drillstring unstuck. Such a process may involve applying one or more of torque, tension, compression, or impact (e.g. jarring) on the drillstring from the surface. The transmission of such torque, tension, compression, or impact down the drill-string to the stuck point may be subject to similar borehole drag, borehole-torque, and borehole conditions consuming portions of the transmitted forces. Comparing the expected and measured forces along the drillstring may be used to improve the control and efficacy of such processes.

Figure 22:
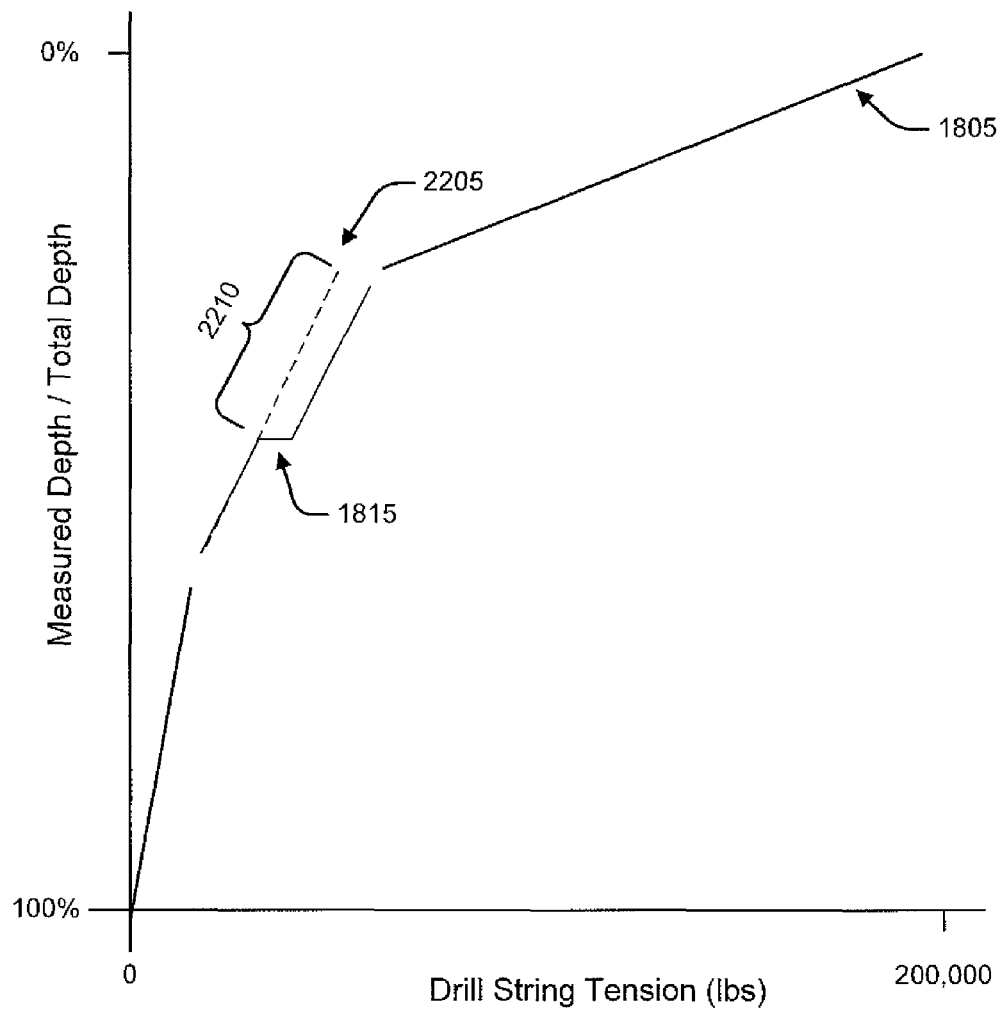
FIG. 22 illustrates a drillstring tension versus depth measured value set.

As noted earlier, in certain implementations, measured-value sets may be used directly to provide one or more expected values or an expected-value set for purposes of the methods discussed. For example the detection, identification, location, and characterization of a borehole deviation such as the deviation discussed with regard to FIG. 18, may be performed with one or more expected values derived directly from the measured value set. FIG. 22 shows the measured value set from FIG. 18 (1805, which is shown as a solid line in this figure) of drillstring tension for a drillstring engaged in pick up. The expected value set is omitted from FIG. 22 The processor 180 or the user may detect existence of a downhole condition based upon the presence of a relatively abrupt change in the measured gradient (1815). The processor 180 or user may extrapolate the measured value gradient of depth interval (2205), uphole to the depth interval of abrupt change in measured gradient 1815, to establishing one or more expected values or an expected value gradient over interval 2210 to compare with the measured values over the range 2210. The principles of this example may be applied to other example implementations of the invention.

Figure 23:
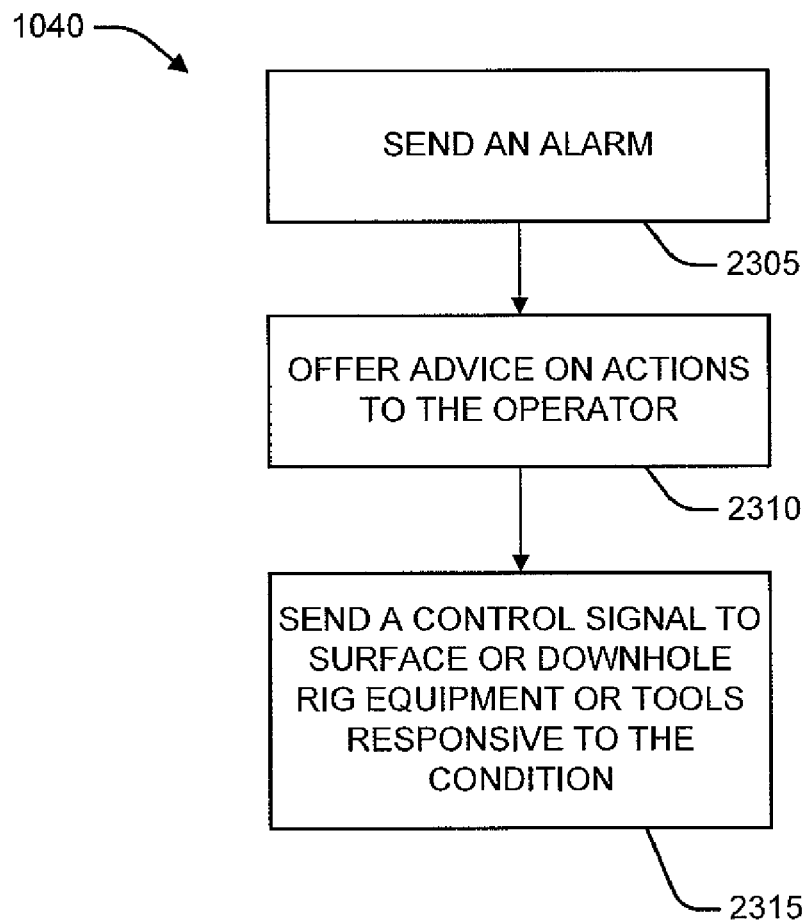
FIGS. 23-24 show block diagrams of systems for additional action based on detected conditions.
Figure 24:
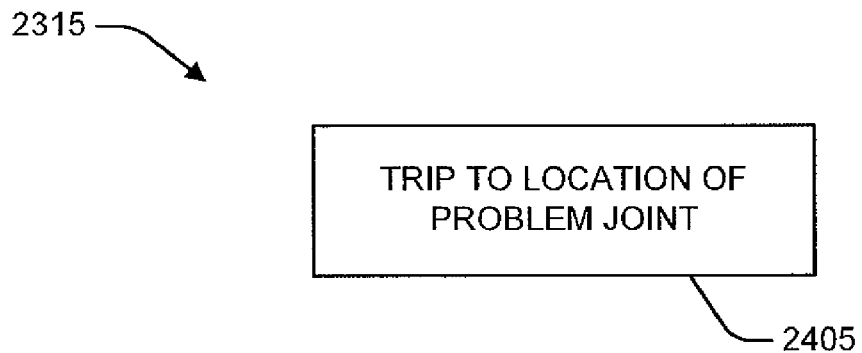

The processor 180 may perform additional actions after detecting a downhole condition (block 1040). As shown in FIG. 23, the additional actions may include one or more of the following:
sending an alarm (block 2305), offering advice on actions to the operator (e.g. shut-in the borehole, change fluid density or other properties, change flow rate, jar, change rotary speed, short trip (e.g. for hole cleaning) (block 2310), or sending a control signal to surface or downhole rig equipment or tools responsive to the condition (block 2315). As shown in FIG. 24, for example, the control signal may cause the surface or downhole rig equipment to trip to the location of a problem within the borehole, (block 2405) for example to clean up a borehole obstruction. The control signal may additionally or alternatively cause other automated actions. These actions may include, for example: shutting-in the borehole, changing fluid density or other property, changing flow rate, jarring, changing rotary speed, or short tripping.

As noted earlier, in certain implementations one or more of the measured-value set of forces (e.g., measured tension/compression or torque values) and the expected-value set of forces may be provided to the user for manual interpretation through comparison of tables, plots, logs, graphs, or the like. In these cases the processor 180 may be used in the collection of measured data, and the user may manually (e.g., without reliance on the processor) perform the steps outlined above of detecting, identifying, locating, and characterizing a downhole condition. In these cases the processor 180 may be used in the collection of measured data and the displaying or otherwise providing such data in the context of expected values, and the user may manually perform the steps outlined above of detecting, identifying, locating, and characterizing a downhole condition.

Figure 25:
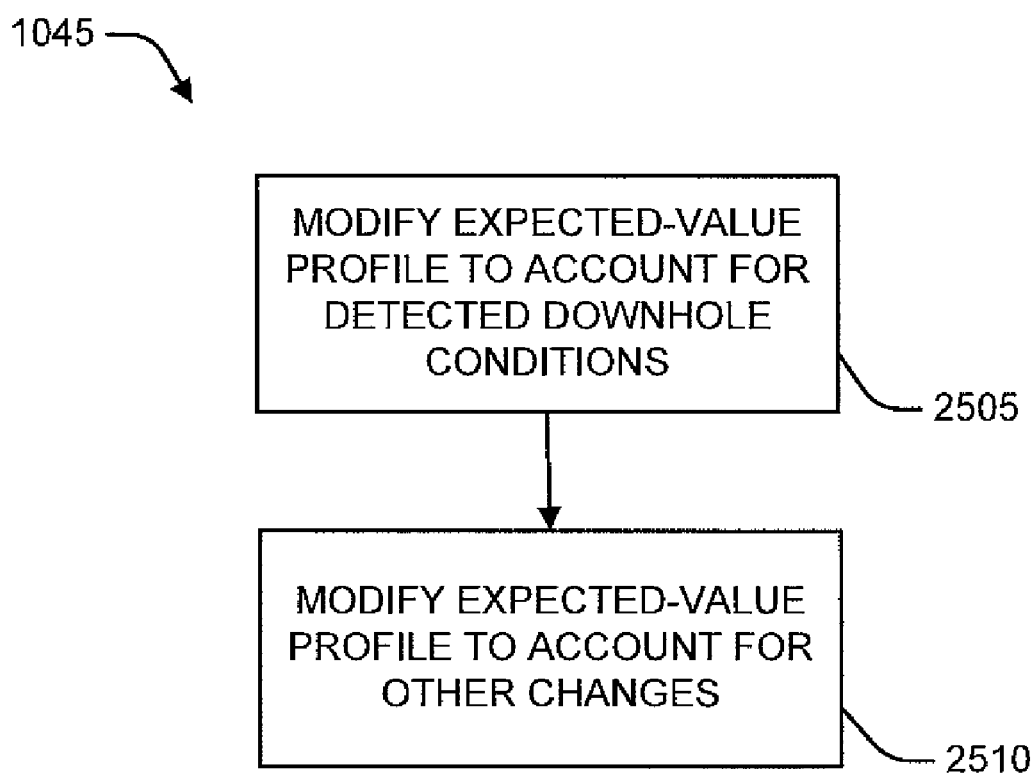
FIG. 25 shows a block diagram of a system for modifying an expected value set.

The processor 180 may also modify the expected-value set (block 1045), as shown in FIG. 25. The processor 180 may modify the expected-value set to account for a detected downhole condition (block 2505). The processor 180 may modify the expected-value set to account for other factors, such as those discussed with respect to determining the expected value set (block 2510).

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method of analyzing one or more downhole properties, comprising:
   receiving a plurality of force measurements, each corresponding to a location along a drillstring, the drillstring comprising a drillpipe, and where at least one force measurement corresponds to a location along the drillpipe;
   performing at least one action based, at least in part, on the at least one force measurement;
   wherein at least one of the force measurements comprise at least one of a torque measurement or a tensile force measurement.

2. The method of claim 1, where performing at least one action based, at least in part, on the at least one force measurement, further comprises:
   performing at least one action based, at least in part, on at least three force measurements.

3. The method of claim 1, further comprising:
   measuring force at a plurality of locations along the drillstring, where forces at two or more locations are measured substantially simultaneously.

4. The method of claim 1, further comprising:
   identifying at least one downhole condition.

5. The method of claim 1, further comprising:
   locating at least one downhole condition.

6. The method of claim 1, further comprising:
   characterizing at least one downhole condition.

7. The method of claim 1, further comprising:
   receiving at least one pressure measurement, wherein the pressure measurement corresponds to a location along the drillstring; and
   wherein detecting at least one downhole condition is based, at least in part, on the pressure measurement.

8. The method of claim 7, further comprising:
   identifying at least one downhole condition, based, at least in part, on the pressure measurement.

9. The method of claim 7, further comprising:
   locating at least one downhole condition, based, at least in part, on the pressure measurement.

10. The method of claim 7, further comprising:
    characterizing at least one downhole condition, based, at least in part, on the pressure measurement.

11. The method of claim 1, where performing one or more actions in response to the detected downhole condition comprises tripping the drillstring to a location of the downhole condition.

12. The method of claim 1, where performing one or more actions in response to the detected downhole condition comprises one or more of:
    adjusting a mud property; and
    adjusting flow rate.

13. The method of claim 1, where performing one or more additional actions in response to the detected downhole condition comprises shutting-in the borehole.

14. The method of claim 1, where performing one or more additional actions in response to the detected downhole condition comprises one or more of:
    short-tripping;
    jarring; and
    adjusting rotary RPM.

15. A measurement-while-drilling system for collecting and analyzing one or more force measurements, comprising:

a plurality of force sensors to measure forces at a drillstring, where at least one force sensor is located along a drillpipe;
a processor; and
a memory, the memory including executable instructions that, when executed, cause the processor to:
cause at least one additional action to be performed based, at least in part, on at least one measured force;
wherein at least one of the force measurements comprise at least one of a torque measurement or a tensile force measurement; and
wherein at least one of the force sensors is coupled to the processor.

16. The measurement-while-drilling system of claim 15, wherein the executable instructions further cause the processor to:
identify at least one downhole condition.

17. The measurement-while-drilling system of claim 15, wherein the executable instructions further cause the processor to:
locate at least one downhole condition.

18. The measurement-while-drilling system of claim 15, further comprising:
at least one pressure sensor to measure a pressure at a location along the drillstring; and
wherein the executable instructions further cause the processor to:
cause at least one additional action to be performed based, at least in part, on the measured pressure.

19. The measurement-while-drilling system of claim 15, wherein the executable instructions that cause at least one additional action to be performed based, at least in part, on at least one measured force further cause the processor to:
cause the system to trip the drillstring to a location of the downhole condition.

20. The measurement-while-drilling system of claim 15, wherein the executable instructions cause at least one additional action to be performed based, at least in part, on at least one measured force further cause the processor to:
cause the system to perform at least one of:
adjusting a mud property; or
adjusting flow rate.

21. A method comprising:
receiving a plurality of force measurements, each corresponding to a location along a drillstring, the drillstring comprising a drillpipe, and where at least one force measurement corresponds to a location along the drillpipe;
displaying at least one graphical representation of one or more of the received plurality of force measurements;
wherein at least one of the force measurements comprise at least one of a torque measurement or a tensile force measurement.

22. The method of claim 21, further comprising:
determining an expected-value set comprising a plurality of expected forces and corresponding depths; and
wherein displaying at least one graphical representation of one or more of the received plurality of force measurements, further comprises displaying a graphical juxtaposition of the measured-value set and the expected-value set.

23. A method of analyzing one or more downhole properties, comprising:
receiving a plurality of force measurements, each corresponding to a location along a drillstring, the drillstring comprising a drillpipe, and where at least one force measurement corresponds to a location along the drillpipe;
providing an indication to an operator based, at least in part, on the at least one force measurement;
wherein at least one of the force measurements comprise at least one of a torque measurement or a tensile force measurement.

24. The method of claim 23, further comprising:
offering advice on actions to the operator.

25. A method comprising:
receiving a first plurality of force measurements, each force measurement corresponding to a location along a drillstring, the drillstring comprising a drillpipe, and where at least one force measurement corresponds to a location along the drillpipe;
creating a first measured-value set comprising the first plurality of force measurements and corresponding depths;
receiving a second plurality of force measurements taken at a different time from the first plurality of force measurements, each force measurement corresponding to a location along a drillstring;
creating a second measured-value set comprising the second plurality of force measurements and corresponding depths; and
creating a representation for an operator of both the first measured value set and the second measured-value set.

26. The method of claim 25 wherein said representation comprises a graphical format.

27. The method of claim 25 wherein said representation comprises a textual format.

28. A method of analyzing one or more downhole properties, comprising:
receiving, at a first time, a first plurality of force measurements, each corresponding to a location along a drillstring, the drillstring comprising a drillpipe, and where at least one force measurement corresponds to a location along the drillpipe;
determining, based at least in part on the first plurality of force measurements whether or not a downhole condition is present; and
wherein at least one of the force measurements comprise at least one of a torque measurement or a tensile force measurement.

29. The method of claim 28, further comprising:
receiving, at a second time, a second plurality of force measurements, each corresponding to a location along a drillstring, the drillstring comprising a drillpipe, and where at least one force measurement corresponds to a location along the drillpipe; and
wherein determining, based at least in part on the first plurality of force measurements whether or not a downhole condition is present, further comprises:
determining, based at least in part on the first and second pluralities of force measurements wherever a downhole condition is present.

30. A method of analyzing one or more downhole properties, comprising:
receiving, at a first time, a first plurality of force measurements, each corresponding to a location along a drillstring, the drillstring comprising a drillpipe, and where at least one force measurement corresponds to a location along the drillpipe;
determining, based at least in part on the first plurality of force measurements, a measured property;

determining an expected property corresponding to the measured property;

determining whether or not a difference between the measured property and the expected property is greater than a maximum delta.

31. The method of claim 30, further comprising:

receiving, at a second time, a second plurality of force measurements, each corresponding to a location along a drillstring, the drillstring comprising a drillpipe, and where at least one force measurement corresponds to a location along the drillpipe; and wherein determining, based at least in part on the first plurality of force measurements, a measured property, further comprises:

determining, based at least in part on the first and second pluralities of force measurements the measured property.

32. The method of claim 30, wherein the measured property and the expected property are torques.

33. The method of claim 30, wherein the measured property and the expected property are tension gradients.

34. The method of claim 30, wherein the measured property and the expected property are torque gradients.

35. A measurement-while-drilling system for collecting and analyzing one or more force measurements, comprising:

a plurality of force sensors to measure forces at a drillstring, where at least one force sensor is located along a drillpipe;

a processor; and a memory, the memory including executable instructions that, when executed, cause the processor to:

receive, at a first time, a first plurality of force measurements, each corresponding to a location along a drillstring, the drillstring comprising a drillpipe, and where at least one force measurement corresponds to a location along the drillpipe;

determine, based at least in part on the first plurality of force measurements, a measured property;

determine an expected property corresponding to the measured property;

determine whether or not a difference between the measured property and the expected property is greater than a maximum delta.

36. The measurement-while-drilling system of claim 35, wherein the executable instructions further cause the processor to:

receive, at a second time, a second plurality of force measurements, each corresponding to a location along a drillstring, the drillstring comprising a drillpipe, and where at least one force measurement corresponds to a location along the drillpipe; and when determining, based at least in part on the first plurality of force measurements, a measured property, the executable instructions further cause the processor to:

determine, based at least in part on the first and second pluralities of force measurements the measured property.

37. The measurement-while-drilling system of claim 35, wherein the measured property and the expected property are torques.

38. The measurement-while-drilling system of claim 35, wherein in the measured property and the expected property are tension gradients.

39. The measurement-while-drilling system of claim 35, wherein the measured property and the expected property are torque gradients.

* * * * *